(12) United States Patent
LeVey

(10) Patent No.: US 10,589,959 B2
(45) Date of Patent: Mar. 17, 2020

(54) DRIVEN REEL TROLLEY

(71) Applicant: Cerro Wire LLC, Hartselle, AL (US)

(72) Inventor: Kenneth LeVey, Chicago, IL (US)

(73) Assignee: Cerro Wire LLC, Hartselle, AL (US)

( * ) Notice: Subject to any disclaimer, the term of this patent is extended or adjusted under 35 U.S.C. 154(b) by 197 days.

(21) Appl. No.: 15/832,141

(22) Filed: Dec. 5, 2017

(65) Prior Publication Data

US 2018/0155158 A1 Jun. 7, 2018

Related U.S. Application Data

(60) Provisional application No. 62/429,989, filed on Dec. 5, 2016, provisional application No. 62/448,764, filed
(Continued)

(51) Int. Cl.
| | |
|---|---|
| *B65H 75/44* | (2006.01) |
| *B60P 3/035* | (2006.01) |
| *B65H 75/40* | (2006.01) |

(52) U.S. Cl.
CPC .......... *B65H 75/4497* (2013.01); *B60P 3/035* (2013.01); *B65H 75/403* (2013.01)

(58) Field of Classification Search
CPC .............. B65H 75/4497; B65H 75/425; B65H 75/403; B65H 49/32; B65H 49/325;
(Continued)

(56) References Cited

U.S. PATENT DOCUMENTS

| 512,720 | A | * | 1/1894 | Krupicka | ............. B65H 75/425 |
| | | | | | 242/394.1 |
| 526,692 | A | * | 10/1894 | Dunwiddie | .......... B65H 75/403 |
| | | | | | 242/391.1 |

(Continued)

FOREIGN PATENT DOCUMENTS

| DE | 102011107239 B3 | 12/2012 |
| GB | 191404037 A | 2/1915 |

(Continued)

OTHER PUBLICATIONS

International Search Report issued by ISA/EPO in connection with PCT/US2017/064707 dated Apr. 11, 2018.
(Continued)

*Primary Examiner* — Glenn F Myers
(74) *Attorney, Agent, or Firm* — Levenfeld Pearlstein, LLC

(57) ABSTRACT

A driven reel trolley includes a carriage having a lower carriage section formed from opposing longitudinal members and transverse connecting members extending between and connecting the opposing longitudinal members. A pair of opposing support beams extend upwardly from the lower carriage. Each beam has a shaft support opening at about the top thereof for accommodating an associated shaft. A pair of non-driven wheels is mounted to the lower carriage section on opposing transverse sides of the lower carriage section and a pair of drive wheels is mounted to the lower carriage section, on opposing transverse sides of the lower carriage section, spaced from the non-driven wheels. A pair of drive trains operably connects the shaft and a respective one of the drive wheels. Each drive train includes a transmission and each transmission is operably engageable with and disengageable from the shaft and its respective drive wheel.

12 Claims, 17 Drawing Sheets

Related U.S. Application Data on Jan. 20, 2017, provisional application No. 62/552,113, filed on Aug. 30, 2017.

(58) Field of Classification Search
CPC ......... B65H 49/34; B65H 67/02; B60P 3/035; B60P 3/2265; B66C 9/10; B66C 9/14; B62B 3/002
See application file for complete search history.

(56) References Cited

U.S. PATENT DOCUMENTS

| | | | |
|---|---|---|---|
| 1,152,273 A | | 8/1915 | Boland |
| 1,188,277 A | * | 6/1916 | Jones ................... B65H 75/403 242/391.2 |
| RE20,191 E | * | 12/1936 | Mathey ................... B66D 1/38 102/313 |
| 3,157,370 A | | 11/1964 | Govatsos et al. |
| 4,467,893 A | | 8/1984 | Hobson |
| 4,711,407 A | | 12/1987 | Boon |
| 4,925,435 A | * | 5/1990 | Linklater ................. A01K 3/00 180/53.6 |
| 5,366,339 A | | 11/1994 | Gould |
| 5,957,400 A | * | 9/1999 | Brannen .............. B65H 75/403 137/355.27 |
| 9,120,636 B2 | | 9/2015 | Cavirani et al. |
| 2004/0182615 A1 | * | 9/2004 | Matte ..................... A61G 5/042 180/68.1 |
| 2011/0280701 A1 | | 11/2011 | Brighenti et al. |
| 2012/0153654 A1 | | 6/2012 | Cole |
| 2017/0362050 A1 | | 12/2017 | LeVey |

FOREIGN PATENT DOCUMENTS

| | | | |
|---|---|---|---|
| GB | 1280107 A | | 7/1972 |
| JP | 11187777 A | * | 7/1999 |
| JP | 2001158574 A | | 6/2001 |
| JP | 2015129052 A | | 7/2015 |

OTHER PUBLICATIONS

Written Opinion of the International Searching Authority issued by ISA/EPO in connection with PCT/US2017/064707 dated Apr. 11, 2018.

International Preliminary Report on Patentability issued by ISA/EPO in connection with PCT/US2017/064707 dated Jun. 20, 2019.

* cited by examiner

TERRAIN MANAGEMENT

RAMP/HILL ASSIST

ELEVATOR MOBILITY

RISER ROOM

DRIVEN REEL TROLLEY

CROSS-REFERENCE TO RELATED APPLICATION DATA

This application claims the benefit of and priority to Provisional U.S. Patent application Ser. No. 62/429,989, filed Dec. 5, 2016, titled Driven Reel Trolley, and Provisional U.S. Patent application Ser. No. 62/448,764, filed Jan. 20, 2017, titled Driven Reel Trolley, and Provisional U.S. Patent application Ser. No. 62/552,113, filed Aug. 30, 2017, titled Driven Reel Trolley, the disclosures of which are incorporated herein in their entireties.

BACKGROUND

Cable reels are used to store, transport, take up and pay out supplies of cables, wires and the like. Known cable reels include opposed, generally circular, end flanges and a spool between the opposed end flanges. The spool has a diameter less than that of the end flanges. The cable, wire or the like is wound around the spool and stored for transport.

Cable reels may be transported, for example, by truck, from a facility to a work site. Once delivered to the work site, the cable reels may be moved to locations on-site where the cable or wire may be payed out. The cable reel may be moved, for example, by rolling across a work site on the end flanges.

Some work sites include areas of rough or exposed terrain. The uneven nature of the terrain may make it difficult for a worker to roll the cable reel. Further, the exposed terrain may become soft or muddy, for example, after rainfall. Cable reels can be difficult to move in such environments and may become stuck in soft or muddy terrains. In particular, the end flanges, having a relatively small thickness, tend to sink into soft or muddy terrain due, in part, to the weight of the cable reel and cable or wire stored on the reel.

Cable reel carts or transport devices are known. Typically, these carts have small wheels which makes it difficult to move the reel in rough terrain and to move the reel onto and along ramps. In addition, many such carts have a wide stance or footprint. As such, it may be difficult, at best, to move the carted reels through narrow doorways and the like.

Accordingly, there is a need for a system for readily transporting a cable reel across challenging, e.g., wet or muddy terrain, up and along ramps and through doorways. Desirably, such a system provides a driven reel trolley that can traverse rough and uneven terrain, can be used to pay out such material and can be readily adapted for winding such material onto the trolley.

SUMMARY

According to an embodiment a driven reel trolley includes first and second opposing, spaced apart carriage sections. The carriage sections are configured to receive a reel mounted on an axle between the sections. Each carriage section includes a drive leg and a lift leg. The drive leg has a drive leg wheel mounted thereto and the lift leg has a lift leg wheel mounted thereto.

The lift leg is pivotally mounted to the drive leg at a pivot location. Each carriage section includes a center hub for receiving the axle. The center hub is at a location horizontally below the pivot location and spaced therefrom. Each carriage section includes a drive train operably connecting the center hub to the drive leg wheel and each carriage section includes a connecting member extending between the lift leg and drive leg to pivot the lift leg and drive leg toward and away from each other.

In an embodiment, each carriage section includes a transmission operably connecting the center hub and the drive leg wheel. Rotation of the transmission drives rotation of the drive leg wheels. The transmission can have various and variable gear ratios, for example, of about 20:1. The transmission can have one or more of a drive gear, a neutral gear and a park gear. In an embodiment, in park gear, rotation of the transmission is independent of movement of the drive leg wheels.

The lift leg and drive leg wheels can include all-terrain tires mounted thereto to facilitate moving loaded trolley over rough and uneven terrain. To facilitate steering the trolley, the lift leg wheels are mounted to the lift legs by casters.

The connecting member can be a flexible member and can includes a take-up and pay-out assembly to take-up and pay-out the flexible member to pivot the lift leg and drive leg toward and away from each other. In an embodiment, the take-up and pay-out assembly is a crank and worm gear assembly.

According to an embodiment, a driven reel trolley includes a carriage having a lower carriage section formed from opposing longitudinal members and transverse connecting members extending between and connecting the opposing longitudinal members. A pair of opposing support beams extend upwardly from the lower carriage. The support beams each have a shaft support opening at about the top thereof for accommodating an associated shaft.

A pair of non-driven wheels is mounted to the lower carriage section on opposing transverse sides of the lower carriage section and a pair of drive wheels is mounted to the lower carriage section, on opposing transverse sides of the lower carriage section, longitudinally spaced from the non-driven wheels;

A pair of drive trains, each operably connecting the shaft and a respective one of the drive wheels, includes a transmission. Each transmission is operably engageable with and disengageable from the shaft and its respective drive wheel and is operable in at least a park mode, a neutral mode and a drive mode. The transmissions are operable independently of each other.

In an embodiment, in the park mode, the shaft rotates freely relative to and is disengaged from the drive wheel. In the neutral mode, the shaft and drive wheel rotate freely, independent of and disengaged from each other, and in the drive mode, the shaft and drive wheel are engaged with one another and rotation of the shaft rotates the drive wheel.

Each transmission can include an input side and an output side. The shaft can be operably connected to the input side and the output side is operably connected to its respective drive wheel. The transmission input side can includes an input gear and the output side can include an output gear. In such an embodiment, the shaft includes a shaft gear operably connected to the input side gear and the drive wheel includes a wheel gear operably connected to the output side gear.

Each transmission includes a gear set to operably engage the shaft with its respective drive wheel, and to operably disengage the shaft from and its respective drive wheel. In an embodiment, each transmission gear set is a planetary gear set. A hub can be positioned at about each shaft support opening, each hub housing, at least in part, the gear set.

In an embodiment, the carriage is formed from two opposing, substantially mirror image sections. The sections are joined to one another at plates that have elongated angled openings. The plates are mounted to each other by fasteners such as bolts. The flexible mounting arrangement of the sections allows all of the wheels to remain on the ground when traversing uneven terrain.

In an embodiment, the shaft gear is operably connected to the input gear by a chain, belt or shaft, and the drive wheel gear is operably connected to the output gear by a chain, belt or shaft.

An embodiment of a driven reel trolley includes first and second opposing, spaced apart carriage sections. The carriage sections are configured to receive a reel mounted on an axle between the carriage sections. Each carriage section includes a drive leg having a drive leg wheel mounted thereto and each carriage section includes a center hub for receiving the axle. Each carriage section also includes a drive train operably connecting the center hub to the drive leg wheel. In an embodiment, each of the first and second sections includes a transmission and the first and second section transmissions are operable independent each other. Each transmission can have one or more of a drive gear, a neutral gear and a park gear.

In an embodiment, each carriage section includes a pivot leg and a frame between the drive leg and the pivot leg.

In an embodiment, a driven reel trolley includes first and second opposing, spaced apart carriage sections. The carriage sections are configured to receive a reel mounted on an axle between the carriage sections. Each carriage section includes a drive leg and a lift leg. The drive leg has a drive leg wheel mounted thereto and the lift leg has a lift leg wheel mounted thereto. The lift leg is pivotally mounted to the drive leg at a pivot location. Each carriage section includes a center hub for receiving the axle and each carriage section includes a drive train operably connecting the center hub to the drive leg wheel. Each carriage section includes a connecting member extending between the lift leg and drive leg to pivot the lift leg and drive leg toward and away from each other. The connecting member can be a flexible member. A take-up and pay-out assembly can be used to take-up and pay-out the flexible member.

In an embodiment, each carriage section includes a transmission operably connecting the center hub and the drive leg wheel. Rotation of the transmission drives rotation of the drive leg wheels. The trolley can include all-terrain tires mounted thereto. In an embodiment the lift leg wheels are mounted to the lift legs by casters.

The transmission can be configure with a gear ratio or rotations of the reel to rotations of the drive wheels. In an embodiment, the gear ratio can be, for example, about 20:1. In a park gear, rotation of the transmission is independent of movement of the drive leg wheels.

These and other objects, features, and advantages of the disclosure will be apparent from the following description, taken in conjunction with the accompanying sheets of drawings, wherein like numerals refer to like parts, elements, components, steps, and processes.

BRIEF DESCRIPTION OF THE DRAWINGS

FIGS. 6A-6D illustrate the lift assembly in which FIG. 6A shows the trolley in a loading position with the reel resting on the ground and FIGS. 6B-6D illustrate the trolley in a transport position in which the reel is raised from the ground and moving the trolley and reel;

DETAILED DESCRIPTION

Figure 1:
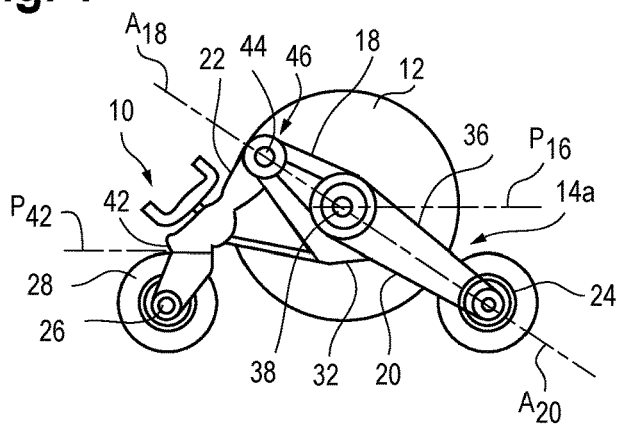
FIG. 1 is a side view of an embodiment of a driven reel trolley having a reel mounted thereto.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Referring to FIG. 1, there is shown a driven reel trolley 10 having a reel 12 mounted thereto. The reel 12 can be used to store, transport and payout (or dispense) elongated material M such as cable, wire and the like. Loaded reels, even those of smaller diameter (about 36 inches), when loaded with cable can be quite heavy, weighing as much as 2500 pounds. Those skilled in the art will recognize the various types of material that can be stored, transported and from reels.

The trolley 10 includes first and second carriage sections 14a,b or halves and an axle 16 extending between and connecting the sections 14a,b to one another. The axle 16 is configured for positioning in the center opening O of the reel 12 to be mounted to the trolley 10. The axle 16 is fixedly mounted to the reel 12 so as to rotate with the reel 12 as the reel 12 rotates, as will be discussed further.

Each section 14a,b includes a frame 18, a drive leg 20 fixedly mounted to the frame and a lift leg 22 pivotally mounted to the frame 10 opposite the drive leg 20. A longitudinal axis $A_{20}$ of the drive leg is substantially collinear with a longitudinal axis $A_{18}$ of the frame 18. In an embodiment the frame 18 and drive leg 20 are formed as an integral unit. Alternately, the frame 18 and drive 20 are formed as separate members fixedly mounted to one another. For purposes of the present discussion the first and second sections 14a,b will be referred to in the singular, but it is to be understood that there are two sections 14a and 14b and that the description herein applies to both sections. Wheels 24, 26 are mounted to the ends of the drive and lift legs, 20, 22, respectively, at ends opposite of the ends mounted to the frame 18. In an embodiment, the wheels 24, 26 have tires 28 mounted thereto that are relatively large profile tires and have tread profiles similar to that of off-road or rough terrain vehicle tires.

Figure 3A:
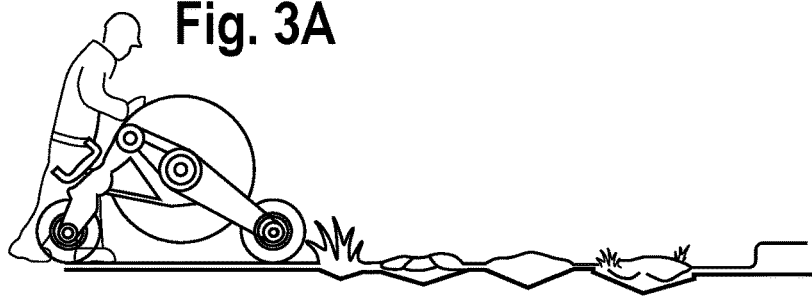
FIGS. 3A-3D illustrated various functional uses of the trolley with a reel mounted thereto.
Figure 3B:
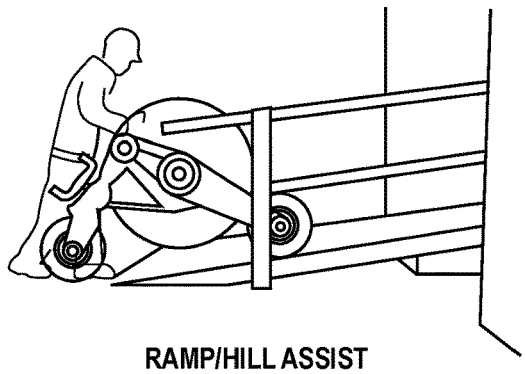
Figure 3C:
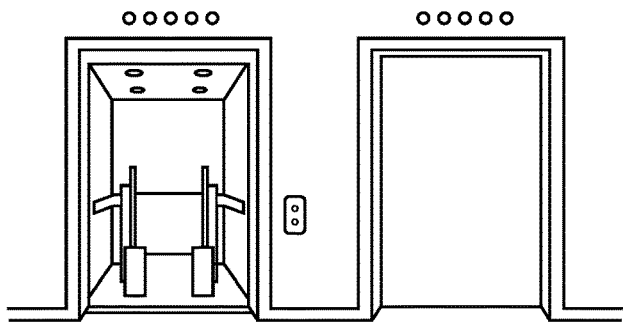
Figure 3D:
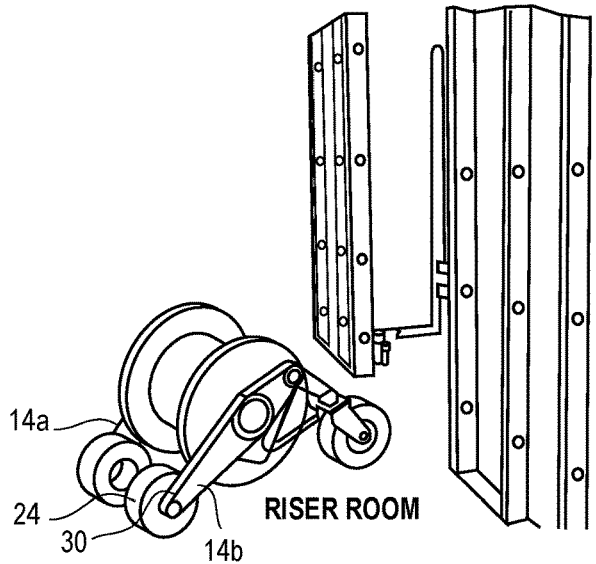

As seen in FIG. 3D, the drive leg wheel or driven wheel 24 is mounted on an inside surface 30 of the leg 20, so as to not extend outwardly of the trolley when it is mounted to a reel. That is, the drive leg wheel 24 is mounted in board of the trolley 10 as mounted to a reel 12. The drive leg 20, at the frame mount (indicated at 32), includes a center locking hub 34 configured to receive and lock onto an end of the axle 16. The locking hub 34 maintains the trolley sections 14a,b mounted to the axle 16 and thus the reel 12. The drive leg 20 includes a drive train, indicated at 36, extending between and connecting the axle 16 and the driven wheel 24. In an embodiment, the drive train 36 is configured such that rotation of the reel 12 is translated into rotation of the driven wheel 24. That is, as the reel 12 is rotated, the driven wheel 24 is likewise rotated.

Figure 2A:
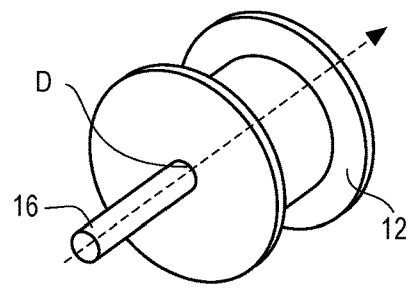
FIGS. 2A-2G illustrate various steps to load a reel onto the trolley and to payout material from the reel as mounted to the trolley, with FIG. 2G illustrating the gear selector.
Figure 2C:
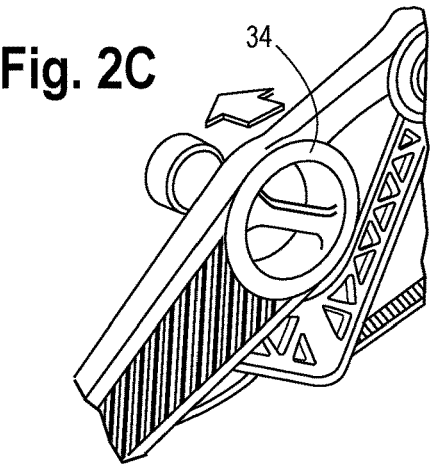
Figure 2B:
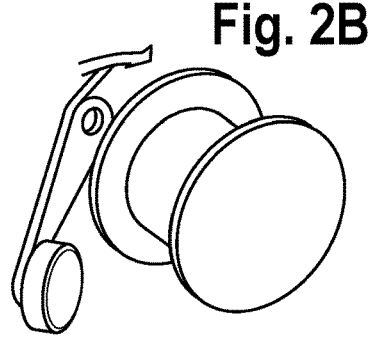
Figure 2D:
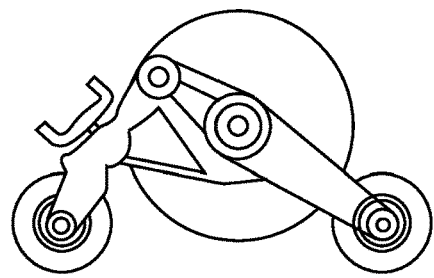
Figure 2E:
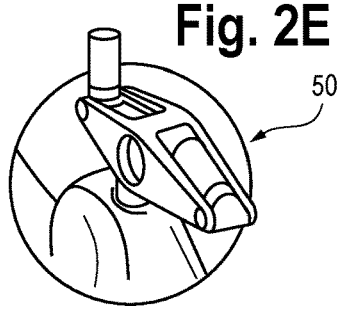
Figure 2G:
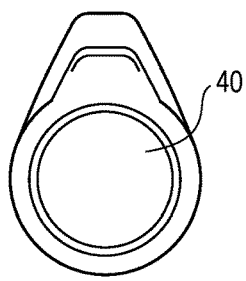
Figure 2F:
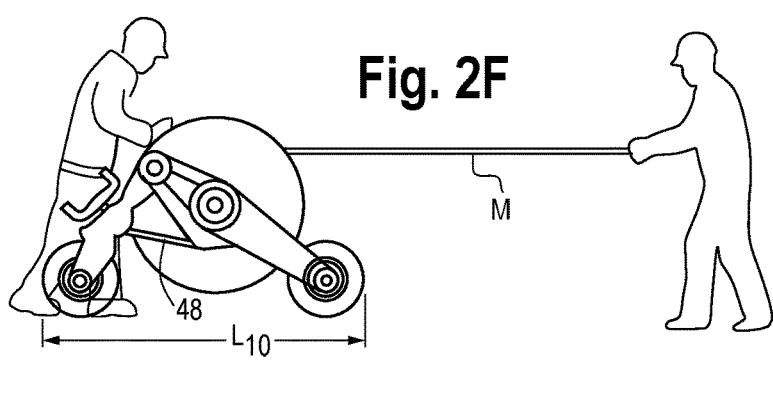

In an embodiment, the drive train 36 includes a transmission or like gear arrangement 38 having a gear selector 40, as seen in FIG. 2G, so that various modes can be selected. For example, the transmission 38 can be configured such that in a desired gear, rotation of the reel 12 rotates the driven wheel 24 forward (a forward gear), in another desired gear the reel 12 can freely rotate without driving the driven wheel 24 (a neutral gear), and in yet another desired gear, rotating the reel 12 (forward or rearward) rotates the driven wheel 24 rearward (a reverse gear). In still another gear, the reel 12 and trolley 10 can be prevented from rotating (a park gear), while the reel 12 is also prevented from rotating. The transmission 38 can be geared so that a single user can rotate the reel 12 which in turn moves the trolley 10. For example, the forward gearing can be about 20:1, that is one complete rotation of the reel 12 results in 20 complete rotations of the driven wheel 24. It is contemplated that the forward gearing can also have multiple gear ratios to permit controlled transport of the loaded trolley 10 in a wide variety of scenarios. All such gearing and/or transmission configuration are within the scope of the present disclosure.

The connection between the axle 16 and the drive train 36 can be, for example, a direct connection, a geared connection or the like. The connection between the transmission 38 and the driven wheel 24 can be a chain drive, a belt drive, a shaft drive, or any other type of direct or indirect drive configuration for transferring rotational movement within the transmission 38 to the driven wheel 24. All such drive configurations will be recognized by those skilled in the art.

As illustrated in FIG. 1, the lift leg 22 is pivotally mounted to the frame 18 at an end of the frame 18 opposite the drive leg 20. The lift leg wheel 26 is mounted to a caster 42 to permit steering the trolley 10. The caster 42 defines a horizontal plane $P_{42}$, that is defined by the rotation of the caster 42, as mounted to the lift leg 22.

The lift leg 22 pivots relative to the frame 18 at a pivot point 44 that is above a horizontal plane defined by the axle (the axle plane $P_{16}$) and near an outer edge of the reel (as indicated at 46) as mounted to the trolley 10. The wheel 26 and caster 42 are mounted to the lift leg 22 in a similar manner to the driven wheel 24, that is they are mounted so as to not extend outwardly of the trolley 10 when it is mounted to a reel 12 (see FIGS. 3C and 3D).

An elongated flexible connecting member 48, such as a cord or nylon strap, extends between the lift leg 22 and the frame 16. In an embodiment the strap 48 is mounted to the lift leg 22 at a location above the caster 42 and to the frame 16 at a point below the center locking hub 34. The strap 48 can be extended and retracted. In a current embodiment, the strap 48 is mounted to a lift crank and worm gear arrangement 50 to permit extending and retracting the strap 48 and thus pivoting the lift leg 22. In this manner, the strap 48 can be extended to lower the locking hub 34 to the axle plane $P_{16}$ (with the reel 12 siting on the ground) to mount the trolley 10 to the axle 16 (which is positioned through the reel 12). The crank arrangement 50 can then be rotated to pivot the lift leg 22 toward the drive leg 20 to raise the reel 12 off of the ground. The caster 42 is mounted to the lift leg 22 so that when the trolley 10 is loaded with a reel 12, the caster plane $P_{42}$ is about horizontal. This provides maximum control, e.g., steering, of the trolley 10 with the mounted reel 12.

As illustrated in FIGS. 3A-3D, the trolley 10 permits storage and ready transport of a loaded reels 12 over a wide variety of rough and muddy terrain (FIG. 3A) up inclines and ramps (FIG. 3B), into elevators having standard width doorways (FIG. 3C) and through doorways into riser rooms (FIG. 3D).

In an embodiment, the overall length $L_{10}$ of the trolley 10 as mounted to a reel 12 is no more than about 68 inches for a standard 36 inch diameter reel 12. As noted above, the tires 28 can have a relatively large profile and have a tread profile similar to that of off-road or rough terrain vehicle tires. It is contemplated that about 16 inch diameter tires 28 are used.

Figure 5:
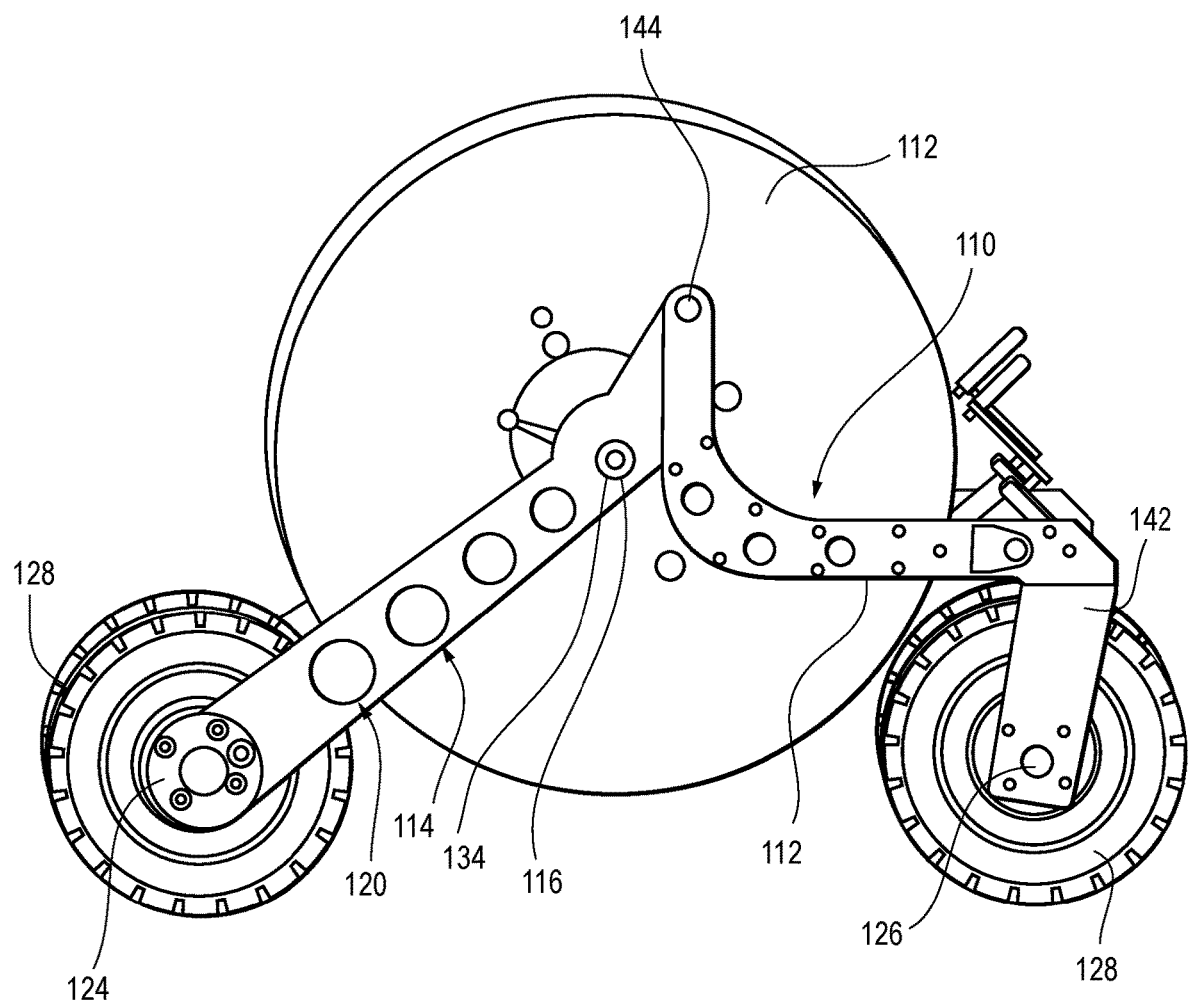
FIG. 5 illustrates an embodiment of the driven wheel trolley.

An alternate embodiment of the trolley 110 is illustrated in FIGS. 5-10. Referring to FIG. 5, in this embodiment, the drive leg 120 and lift leg 122 are pivotally mounted to one another to form a section 114 without a frame extending between the legs 120, 122. In an embodiment, the lift leg 122 is formed as a curved or L-shaped member. As in the prior embodiment, there are two identical or substantially sections 114a and 114b, that are mirror images of one another. And as with the prior embodiment, an axle 116 extends between and connects the sections 114a,b to one another; the axle 116 is configured for positioning in the center opening O of the reel 112 to be mounted to the trolley 110. The axle 116 is fixedly mounted to the reel 112 so as to rotate with the reel 112 as the reel 112 rotates.

For purposes of the present discussion the first and second sections 114a,b are again referred to in the singular, but it is to be understood that there are two sections 114a and 114b and that the description herein applies to both sections. Wheels 124, 126 are mounted to the ends of the drive 120 and lift 122 legs, respectively. In an embodiment, the wheels 120, 122 have tires 128 mounted thereto that are relatively large profile tires and have tread profiles similar to that of off-road or rough terrain vehicle tires.

Figure 9:
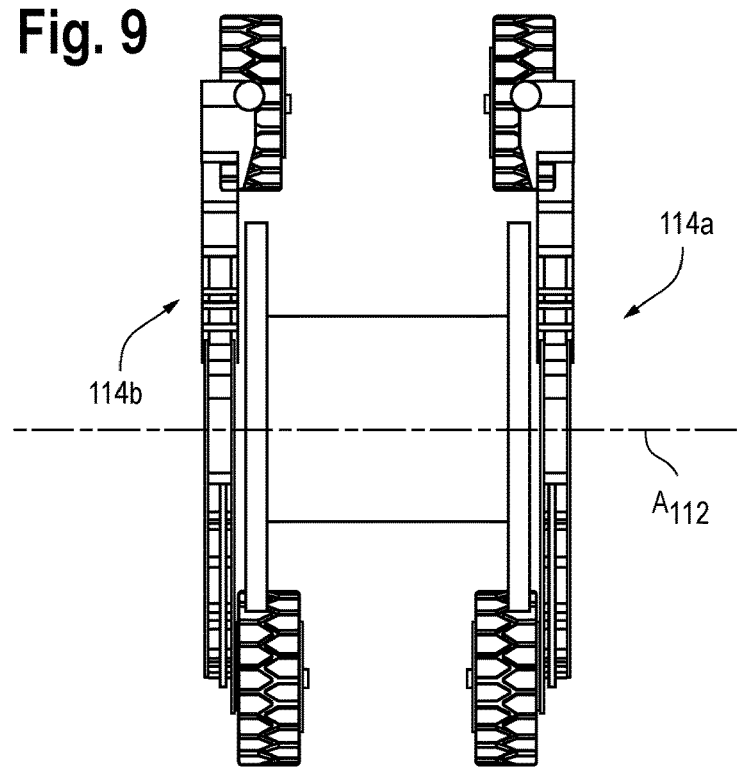
FIG. 9 is an illustration of the trolley as seen in a top view.

As seen in FIGS. 5 and 9, the drive leg wheel 124 or driven wheel is mounted on an inside surface of the leg 120, so as to not extend outwardly of the trolley 110 when it is mounted to a reel 112. The drive leg 120, includes a center locking hub 134 configured to receive and lock onto an end of the axle 116. The locking hub 134 maintains the trolley sections 114 mounted to the axle 116 and thus the reel 112. The drive leg 120 includes a drive train, indicated at 136, extending between and connecting the axle 116 and the driven wheel 124. In an embodiment, the drive train 136 is configured such that rotation of the reel 112 is translated into rotation of the driven wheel 124.

Figure 7A:
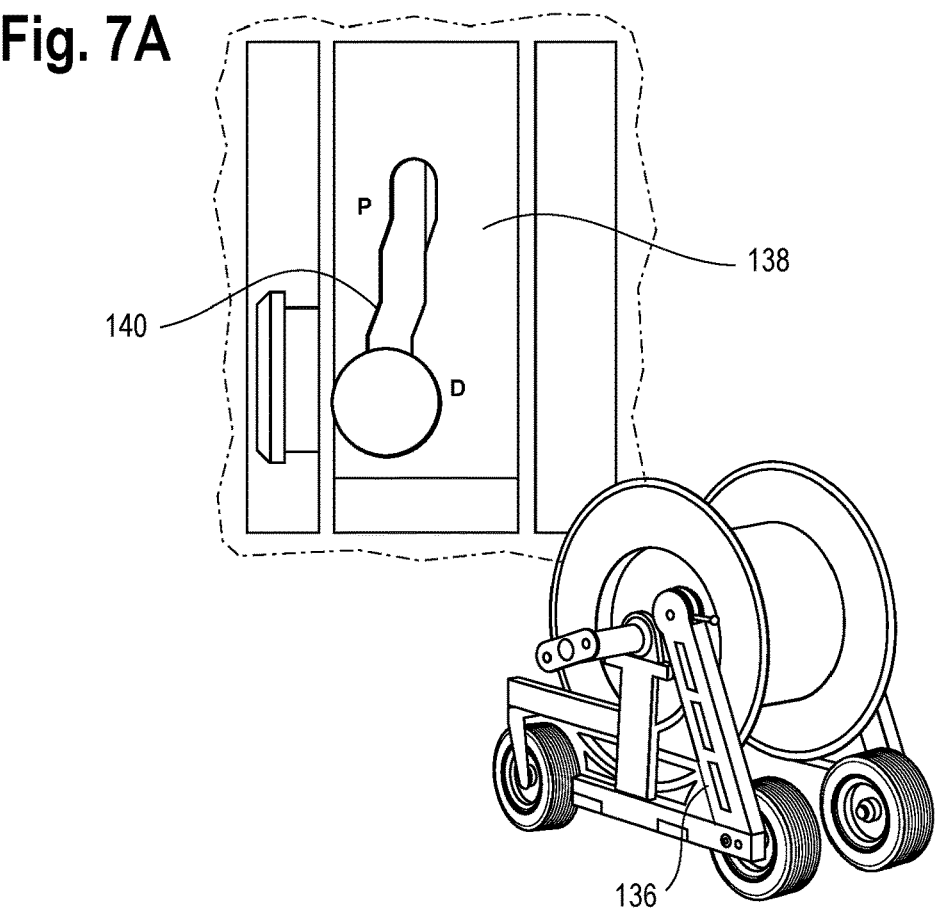
FIGS. 7A and 7B illustrate one example of a gear selector in FIG. 7A, and in FIG. 7B, the driven wheel drive and gearing (reduction gear)
Figure 7B:
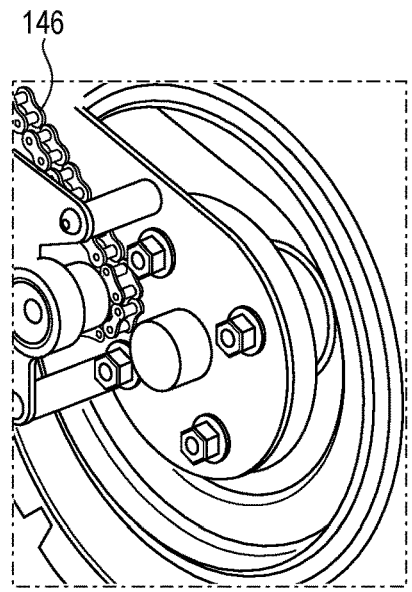
Figure 8A:
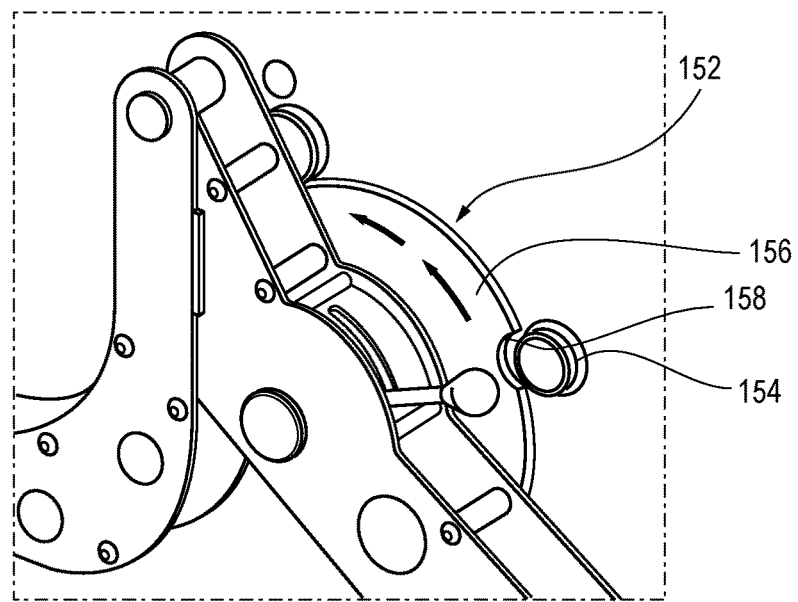
FIGS. 8A and 8B illustrate the cam mounting system for mounting the reel to the trolley.
Figure 8B:
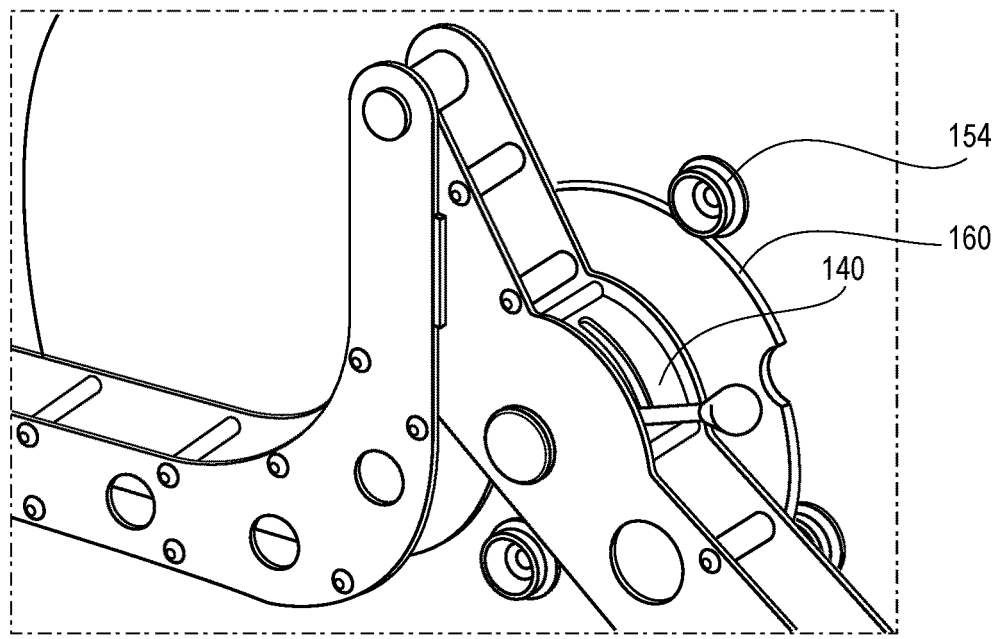

Referring briefly to FIGS. 7A and 7B, and as discussed above with respect to the prior embodiments, the drive train 136 includes a transmission 138 or like gear arrangement having a gear selector 140 so that various modes can be selected. Examples of modes or gears of operation include a park mode or gear in which the driven wheels 124 are locked and the reel 112 can rotate (for example during payout), a neutral mode or gear the allows the trolley 110 to be free-wheeled (also referred to as a free-wheeling mode), and a drive gear or mode in which the driven wheels 124 are driven by rotation of the reel 112. The transmission 138 for each of the sections 114*a,b* and its respective driven wheels 124 can be fully independent of the other so that one wheel 124*a* can be in park gear or mode while the other wheel 124*b* is in neutral or drive, which allows the trolley 110 (and reel 112) to be turned in a tight space, essentially rotated in place. Again, the transmission 138 can be geared so that a single user can move or manipulate the trolley 110. For example, the forward or drive gearing can be about 20:1, that is one complete rotation of the reel 112 results in 20 complete rotations of the driven wheel 124. It is contemplated that the gearing can also have multiple gear ratios to permit controlled transport of the loaded trolley 110 in a wide variety of scenarios. All such gearing and/or transmission configuration are within the scope of the present disclosure.

The connection between the axle 116 and the drive train 136 can be, for example, a direct connection, a geared connection or the like. The connection between the transmission 138 and the driven wheel 124 can be a chain drive, a belt drive, a shaft drive, or any other type of direct or indirect drive configuration for transferring rotational movement within the transmission 138 to the driven wheel 124. As best seen in FIG. 7B, in an embodiment, a chain drive 146 connects the transmission 138 and the driven wheel 124. All such drive configurations will be recognized by those skilled in the art and are within the scope and spirit of the present disclosure.

As illustrated in FIGS. 6A-6D, the lift leg 122 is pivotally mounted to the drive leg 120. As noted above, the lift leg 122 is an L-shaped member with the pivot point 144 located at an end of the "L"; this permits the pivot point 144 (discussed below) to be above the rotational axis $A_{112}$ of the reel 112 as mounted to the trolley 110. The lift leg wheel 126 is mounted to a caster 142 to permit steering the trolley 110. The caster 142 defines a horizontal plane $P_{142}$, that is defined by the rotation of the caster 142, as mounted to the lift leg 122.

The lift leg 122 is pivotally mounted to the drive leg 120 at the pivot point 144, which is above and spaced from the rotational axis $A_{112}$ of the reel 112 which defines a horizontal plane (defined by the axle 116 or the axle plane $P_{116}$). The wheel 126 and caster 142 are mounted to the lift leg 122 in a similar manner to the driven wheel 124, that is they are mounted so as to not extend outwardly of the trolley 110 when it is mounted to a reel 112 (see FIGS. 6A and 9).

Figure 6A:
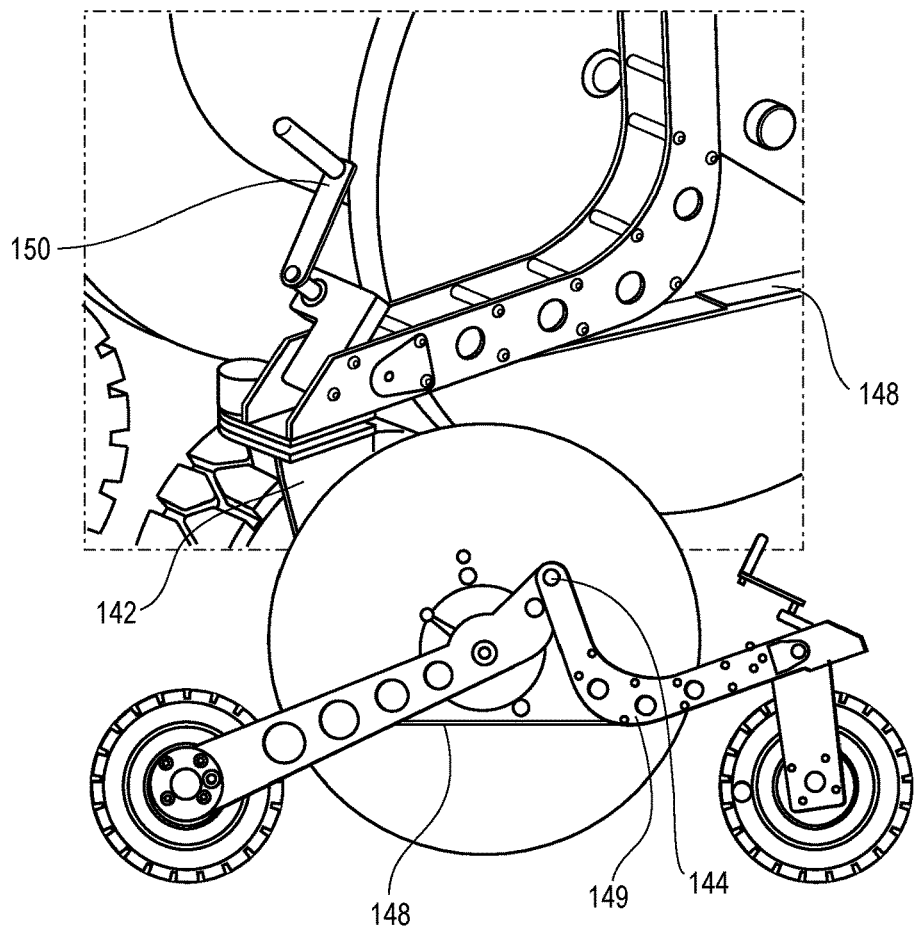
Figure 6B:
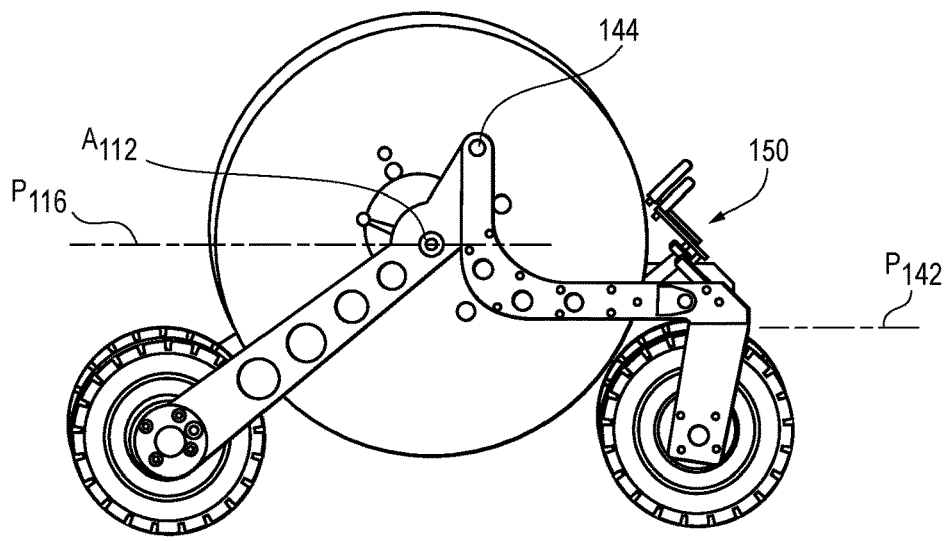
Figure 6C:
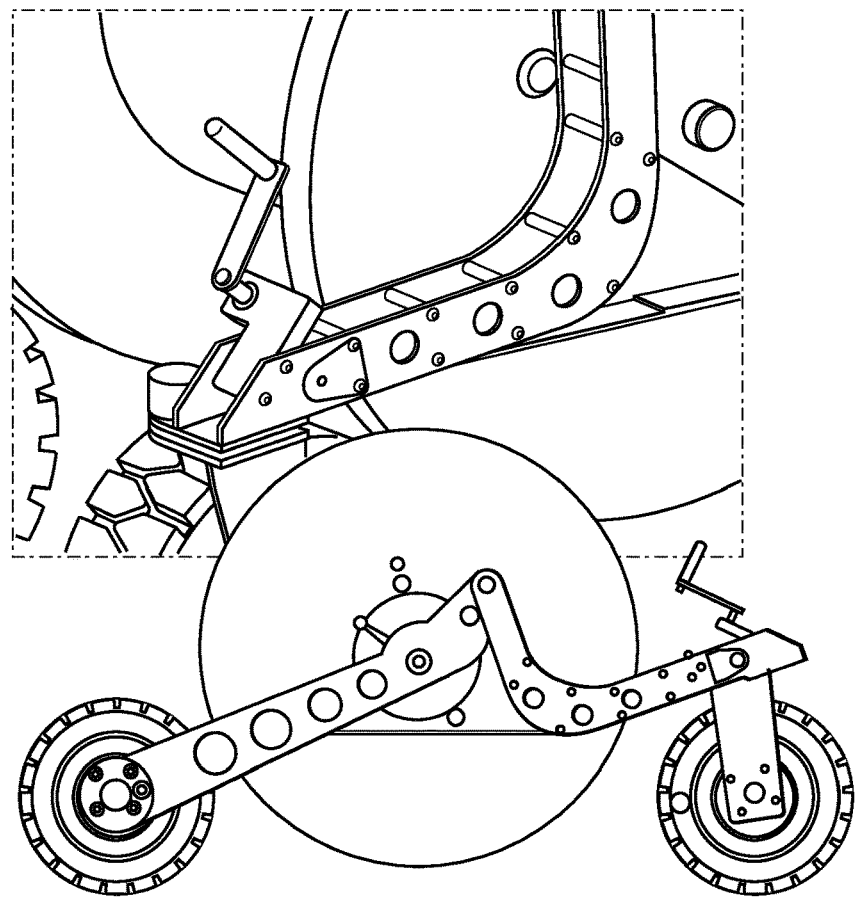
Figure 6D:
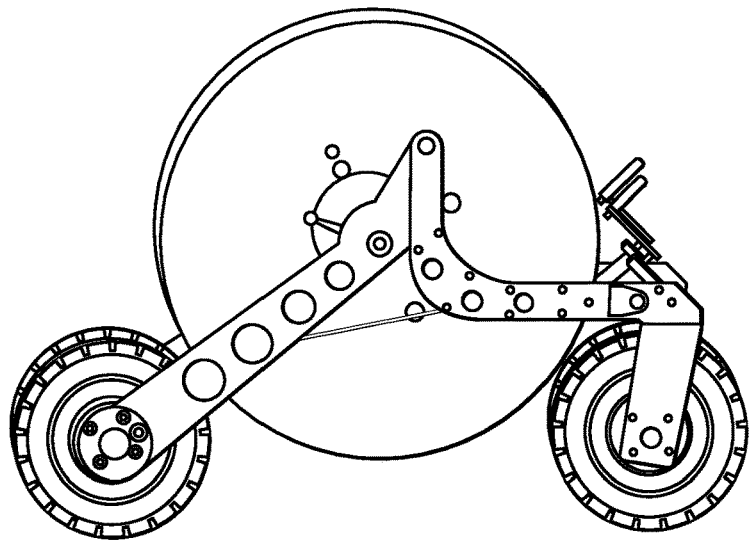
Figure 10:
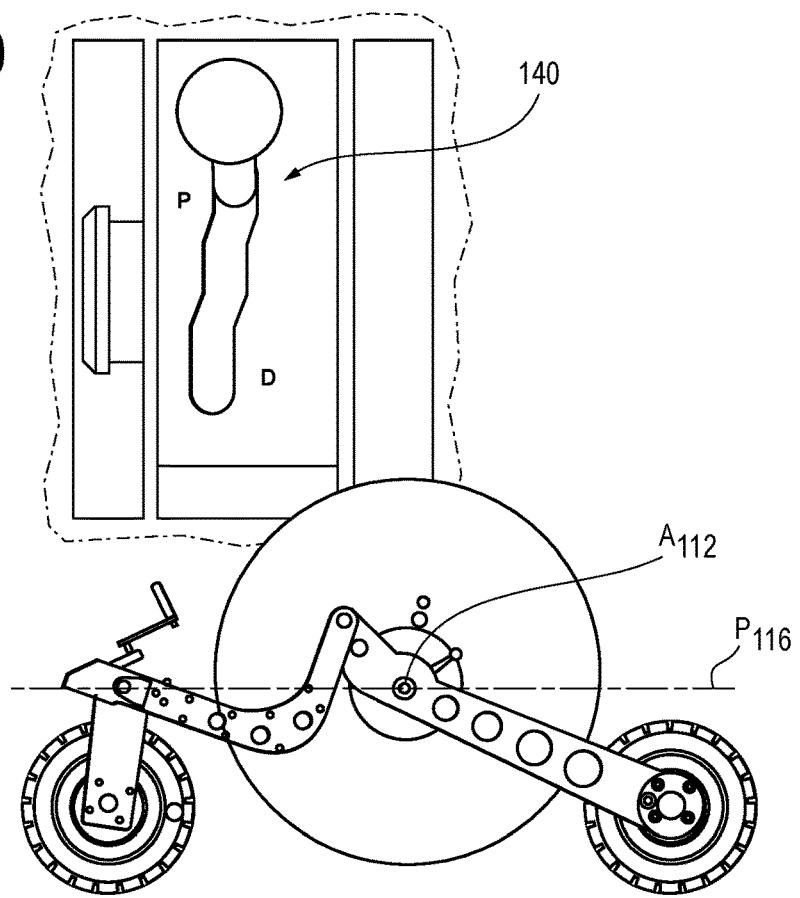
FIG. 10 illustrates the trolley in an example of a payout position in which the reel is lowered from the transport position (FIG. 6D), but the reel is still above the ground, so as to permit the reel to rotate.
Figure 11A:
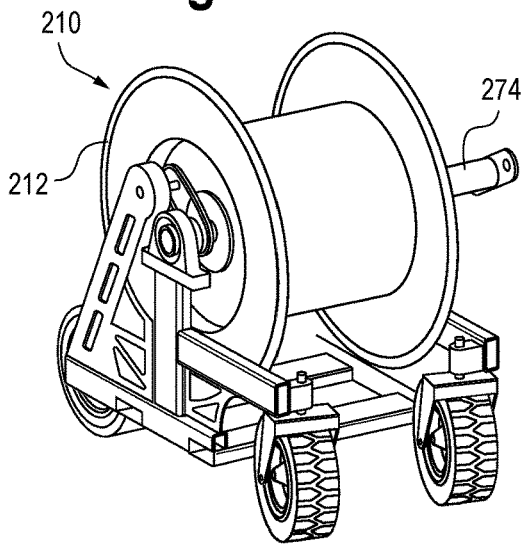
FIGS. 11A and 11B are front and rear perspective views of another embodiment of the driven reel trolley.
Figure 11B:
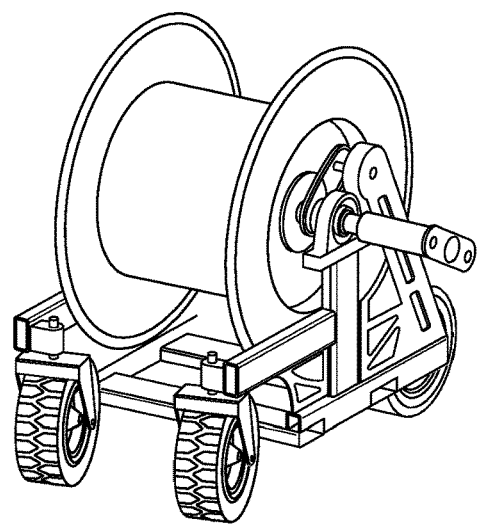
Figure 12:
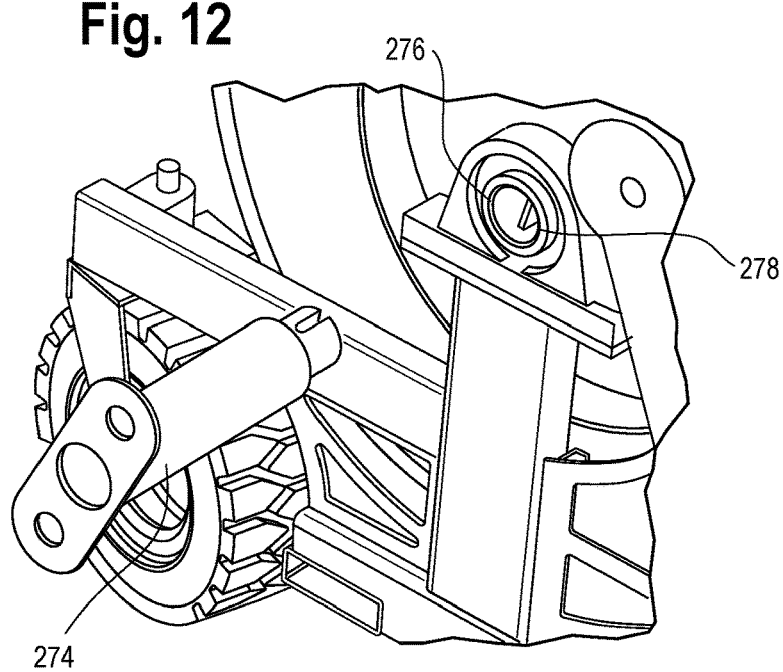
FIG. 12 is a close-up view of the trolley receiver showing an associated adapter for use in a winding operation.
Figure 13A:
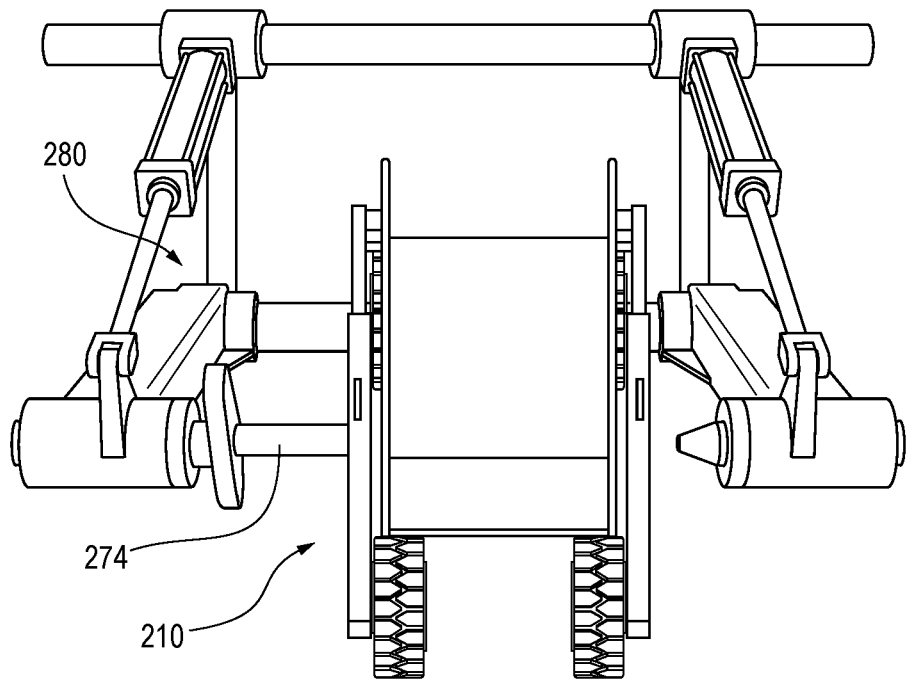
FIG. 13A illustrates an auto-winder for winding cable onto a reel.
Figure 13B:
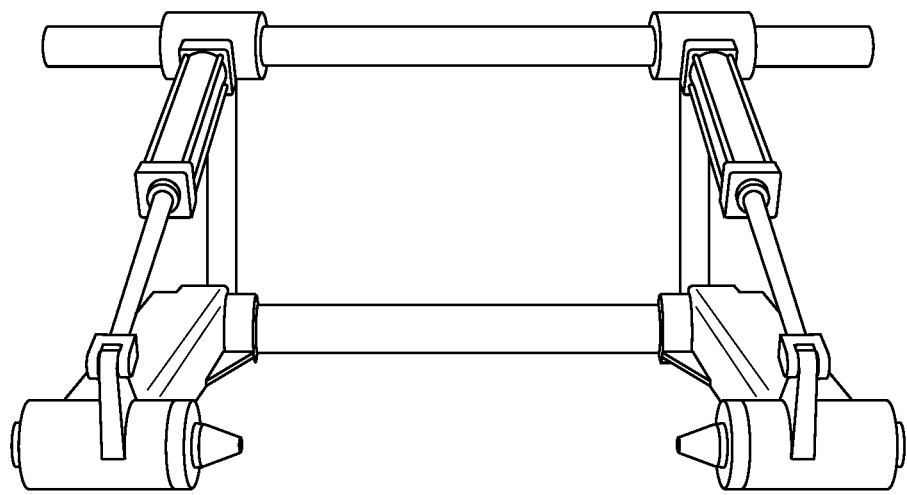
FIG. 13B illustrates an auto-winder with the trolley with a reel thereon positioned in the winder.
Figure 14:
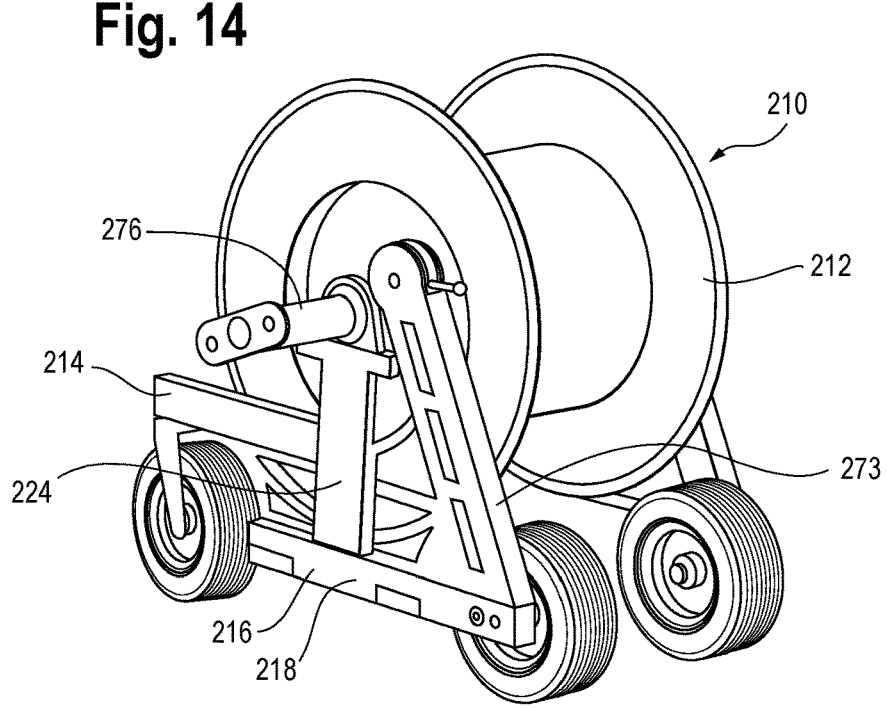
FIG. 14 is another perspective illustration of the embodiment of the trolley of FIGS. 11A and 11B.
Figure 15:
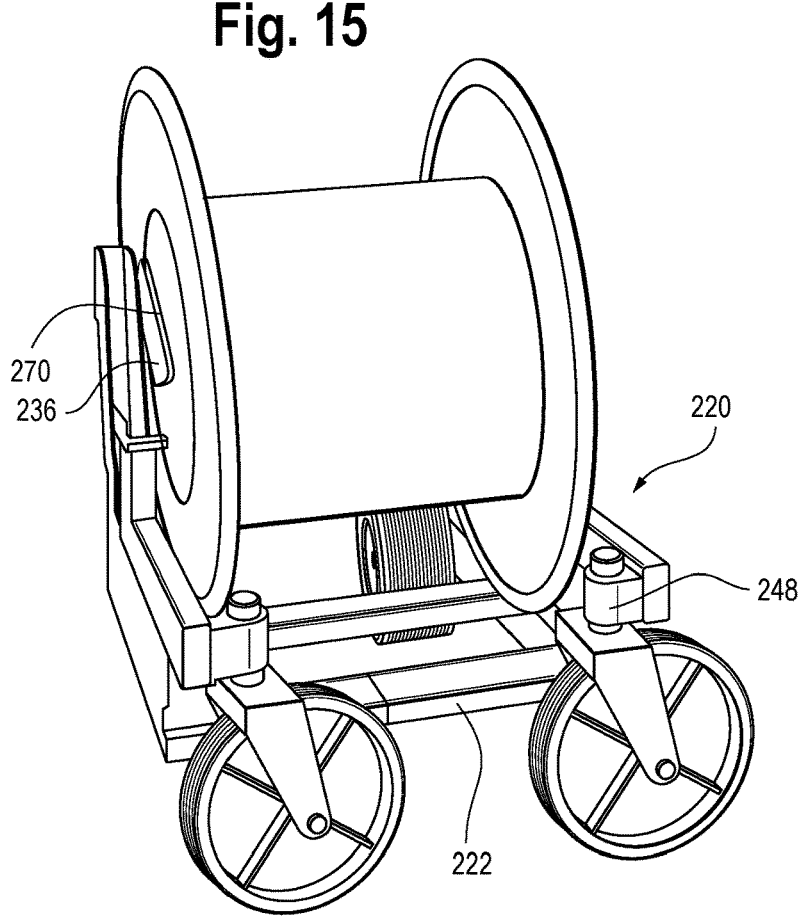
FIG. 15 illustrates the trolley showing a side perspective profile.
Figure 16:
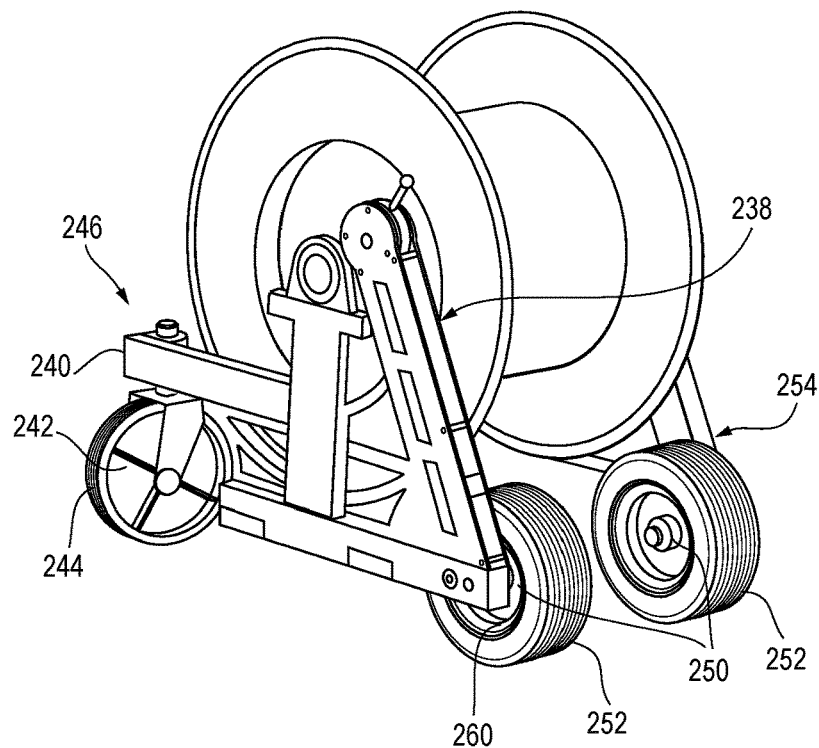
FIG. 16 illustrates the trolley.
Figure 17:
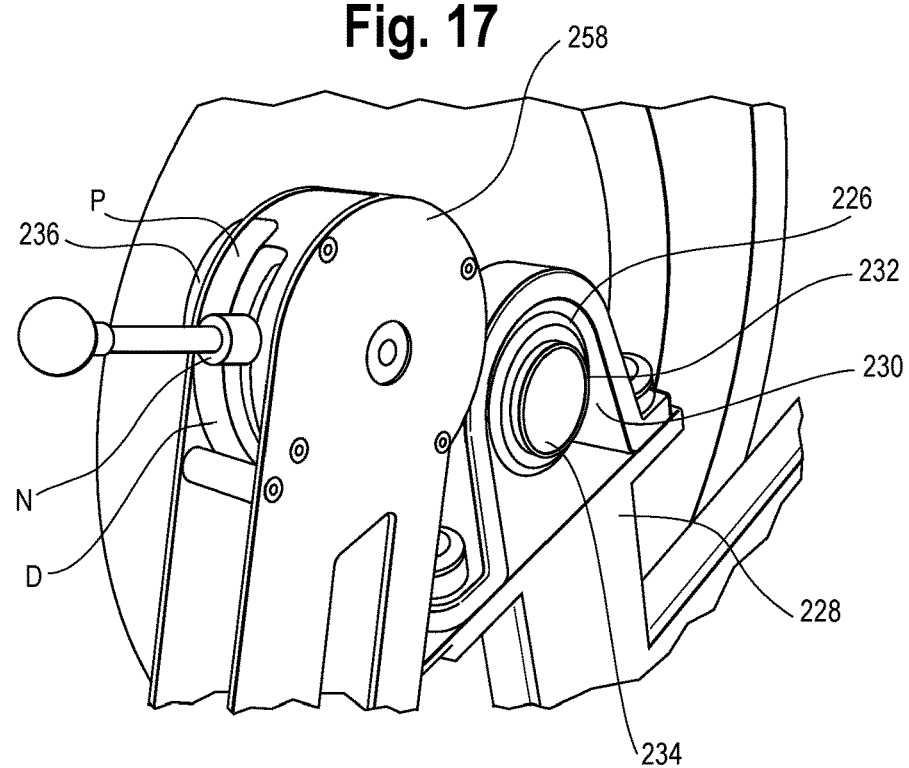
FIG. 17 is a close-up illustration of the transmission and shaft bearing, and showing a portion of the drive train.
Figure 18:
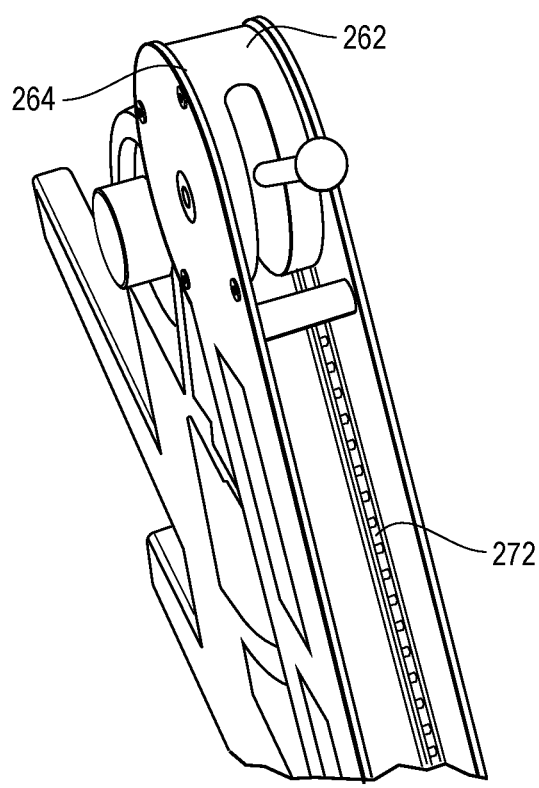
FIG. 18 illustrates a portion of the drive train.

As seen in, for example, FIGS. 6A, 6C and 10, an elongated flexible connecting member 148, such as a cord or nylon strap, extends between the lift leg 122 and the drive leg 120. In an embodiment the strap 148 is mounted to the lift leg 122 at a location at about the corner 149 of the L-shaped member spaced from the caster 142, and to the drive leg 120 intermediate the wheel 124 and the center locking hub 134. The strap 148 can be extended and retracted. In a current embodiment, the strap 148 is mounted to a lift crank and worm gear arrangement 150 on the lift leg 122 to permit extending and retracting the strap 148 and thus pivoting the lift leg 122 and drive leg 120 relative to each other. In this manner, the strap 148 can be extended to lower the locking hub 134 to the axle plane $P_{116}$ (with the reel 112 sitting on the ground) to mount the trolley 110 to the axle 116 (which is positioned through the reel 112). The crank arrangement 150 can then be rotated to pivot the lift leg 122 and drive leg 120 toward one another to raise the reel 112 off of the ground to move the trolley 110. The caster 142 is mounted to the lift leg 122 so that when the trolley 110 is loaded with a reel 112 and ready to move, the trolley 110 with the reel 112 mounted thereon, the caster plane $P_{142}$ is about horizontal. This provides maximum control, e.g., steering, of the trolley 110 with the mounted reel 112. When it is desired to pay out material from the reel 112, the reel 112 can be lowered (but maintained above the ground) using the lift crank 150 to provide greater stability of the reel 112 and trolley 110 during pay out.

Figure 4:
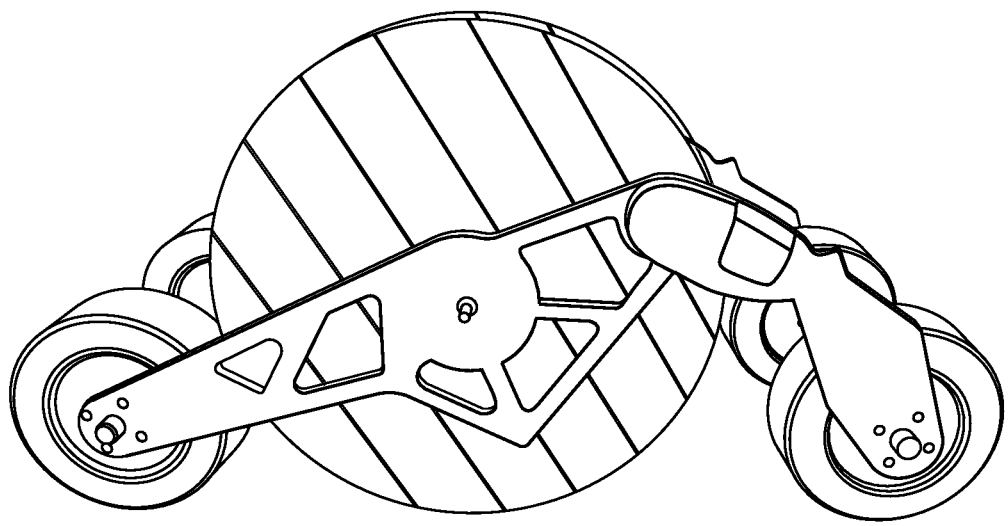
FIG. 4 is a photograph of an example of a prototype driven reel trolley

Referring to FIGS. 6A-6D and 8A-8B, to facilitate mounting the reel 112 to the sections 114, in an embodiment, the trolley 110 includes a cam plate mounting system 152. The system 152 includes a series of cams 154 that mount to standard openings in the reel 112 (conventional reels have four such openings as seen, for example in FIGS. 4 and 5), and a cam plate 156 that mounts to the reel 112. The axle 116 is fixedly mounted to the cam plate 156. The cam plate 156 has cut-outs or recesses 158 that correspond to the location on the reel 112 at which the cams 154 are mounted to the reel 112. The plates 156 (one for each side of the reel 112) and axle 116 are mounted to the reel 112 (one plate 156 with the axle 116 mounted thereto) and the opposite plate 156 is mounted to the axle 116 and reel 112. The plates 156 are then rotated so that a peripheral edge 160 of the plate 156, between the cut-outs 158, engages and locks onto the cams 154 in the reel 112. This locks the plates 156 and axle 116 to the reel 112. It will be appreciated that the cam plate mounting system 152 can be used with any of the embodiments disclosed herein.

Still another embodiment of the driven reel trolley 210 is illustrated in FIGS. 11A-18. As illustrated, in this embodiment, the reel 212 is not raised and lowered by the trolley 210, but is secured in the trolley 210 at a fixed height. The trolley 210 includes a carriage 214 having a lower carriage portion or section 216 formed from opposing longitudinal members 218 (forming opposing sides 220) and transverse connecting members 222 extending between and connecting the opposing longitudinal members 218. Each side 220 includes an upstanding support beam 224 extending upwardly from the lower carriage 216. The upstanding support beams 224 each have a shaft support opening 226 at about the top 228 of the beam 224. Each opening 226 can be defined by, for example, a hub 230 having a bearing 232.

A shaft 234 is positioned between the support beam openings 226, for example, in the bearings 232. The shaft 234 is configured to support the reel 212, such as a cable reel, between the opposing sides 220 of the trolley 210. In this manner, the cable reel 212, on the shaft 234, rides in the bearings 232. The reel 212 can be a conventional, e.g., wooden reel, or the reel 212 can be specially fabricated to remain mounted on the trolley 210.

A drive element 236, such as a gear, is positioned on each side of the shaft 234, inboard of the bearings 232; that is, between the bearings 232 and the cable reel 212. The gear 236, referred to herein as the shaft gear, is part of a drive train 238, discussed in more detail below. The shaft gear 236 is affixed to the shaft.

Legs 240 extend outwardly from the upstanding support beams 224 forwardly of the carriage 214. A wheel 242 and tire 244 are mounted to each leg 240 at a forward end 246 of the trolley 210. The wheels 242, which are idle, non-driven wheels, are mounted to the legs 240 on casters 248 to permit steering the trolley 210. The casters 248 can be free-spinning and may include a brake (not shown) or a rotating position lock (not shown) to lock the position of the casters at a desired angle of rotation.

As in the prior embodiments, the tires 244 can be relatively large profile tires and have tread profiles similar to that of off-road or rough terrain vehicle tires. In addition, the wheels 242, tires 244 and casters 248 are located on the carriage 214 so as to not extend outwardly of the trolley 210 when a reel 212 is mounted thereon.

Drive wheels 250 (and tires 252) are mounted to the lower rear end 254 of the carriage 214. The trolley 210 includes two independent drive trains 238, one on each side 220 of the trolley 210. Each drive train 238 operably connects the shaft 234 and a respective one of the drive wheels 250 and includes a transmission 258. Each transmission 258 is operably engageable with and disengageable from the shaft 234 and its respective drive wheel 250 and is operable in at least a park mode P, a neutral mode N and a drive mode D.

In an embodiment, each drive train 238 includes, and extends from, the shaft gear 236 (at the bearing 232 at the top of the upstanding support beam 224) to the drive wheels 250 via its respective transmission 258. A gear or like drive member 260 is mounted to the drive wheels 250 (wheel gear).

The transmissions 258 control movement of, and engagement and disengagement of the shaft 234 (rotation of the shaft) and the drive wheels 250. To this end, each transmission 258 includes an input side 262 and an output side 264; the input and output sides 262, 264 being engageable with and disengageable from each other. In an embodiment, the input side 262 includes a gear (input gear, not shown) and the output side 264 includes a gear (output gear, not shown). The shaft gear 236 and input gear are operably connected to one another by an input side drive element 270. In an embodiment the input side drive element 270 is an input side drive chain. Likewise, the output gear and wheel gear 260 are operably connected to one another by an output side drive element 272. In an embodiment, the output side drive element 272 is an output side drive chain. A chain guard 273 is positioned over the chain 272.

For purposes of the present disclosure, reference will be made to singular items, but it is to be understood that many of the features disclosed are multiple (or at least pairs) of features that are present on the trolley.

In an embodiment, the transmission 258 has various modes of operation. As noted above, some examples of modes of operation include a park mode or gear P, a neutral mode or gear N and a drive mode or gear D. In park mode, the input and output sides 262, 264 of the transmission 258 are disengaged, the input side 262 is allowed to freely rotate (the reel 212 can freely rotate) and the output side 264 is locked to prevent the drive wheels 250 (and thus the trolley 210) from moving. The park mode may be used, for example, during payout and winding cable onto the reel 212.

In neutral mode, the input and output sides 262, 264 of the transmission 258 are disengaged, the input side 262 is allowed to freely rotate (the reel 212 can freely rotate) and the output side 264 is allowed to freely rotate (the trolley 210 can be moved, e.g., pushed or pulled) independent of rotation of the reel 212.

In drive gear, the input and output sides 262, 264 of the transmission 258 are engaged with each other and rotation of the reel 212 moves or drives the trolley 210. In this mode, if the reel 212 is held still (not rotated), the trolley 210 will not move. This mode can be used, for example, to facilitate moving the trolley 210 along rough terrain or up and/or down a ramp by rotation of the reel 212.

As noted above, the transmission 258 for each of the wheels 250 can be fully independent of the other so that, for example, one transmission 258 can be in park while the other transmission 258 is in drive, which allows the trolley 210 (and reel 212) to be turned in a tight space by rotation of the reel 212, essentially rotating the trolley 210 in place. As in the previous examples, the transmissions 258 can be geared (ratio of reel 212 rotations to wheel 250 rotations) so that a single user can move or manipulate the trolley 210.

It will be appreciated by those skilled in the art that although the drive trains 238 are disclosed and discussed having a transmission 258 axially displaced from the centerline of the shaft 234, multiple gears 236, 260, input side gear/output side gear, chains 270, 272 and the like, the same functionality can be achieved using, for example a planetary gear set (see, for example, FIG. 19 which illustrates an embodiment of a planetary gear set) within the transmission 258 (in which case, the transmission 258 may be axially aligned with the shaft 234 and mounted to or within the hub 230 and may be axially aligned with the shaft 234) to simplify the drive train 238. In addition, power transmission from the transmission 258 to the drive wheels 250 can be accomplished using the aforementioned chains or belts, or, for example, one or more drive shafts (not shown), and the like, using one or more transmissions and differentials to distribute to power to the drive wheels. All such embodiments and configurations of the drive and other features are intended to be and are within the scope and spirit of the present disclosure.

In embodiments, the shaft 234 (supporting the reel 212) can be configured to receive an adapter 274 to allow winding onto the reel 212 while the reel 212 is positioned on the trolley 210. In an embodiment, the shaft 234 is configured with a receiver 276 to receive the adapter 274 to allow winding directly onto the reel 212. For example, as shown in FIGS. 11A-13B, the shaft 234 can includes a keyway 278 to receive the adapter 274, with the adapter 274 configured for attachment to known auto-winding equipment 280. In such an arrangement, the trolley 210, with an empty or partially wound reel 212 thereon, can be positioned in the auto-winder 280 to wind cable or wire directly onto the reel 212 as it is positioned on the trolley 210. In such a winding scenario, the transmission 258 can be shifted into, for example, park so that the wheels 250 are locked and the reel 212 freely rotates so that the wire or cable can wound onto the reel 212. The trolley 210 can be configured with receivers 276 at both ends of the shaft 234 so that the adapter 274 can be installed on either side 220 of the reel 212/trolley 210. In some embodiments, the receiver 276 and adapter 274 are of sufficient strength that the trolley 210 can be lifted by the adapter 274 to raise the trolley 210 from a floor on which it is resting for example, to move the trolley 210 side to side during the winding operation.

With respect to the adapter, it will be appreciated that such a member can take a wide variety of shapes and configurations. So long as there is cooperating geometry between the adapter, the receiver and the auto-winding equipment. For example, the combination of adapter, receiver and auto-winding equipment can be male-to-female mating components, female-to-female mating components, a mortise and tenon arrangement, a chuck-type arrangement, an interference fit arrangement, friction fit interface, pin and hub configurations and the like.

Another embodiment of the trolley 310 and various features thereof are illustrated in FIGS. 19-22. In this embodiment, the trolley 310 has the ability to maintain all of the wheels 324, 326 of the trolley 310 on the ground when traversing uneven terrain. It will be appreciated that a structurally rigid carriage is needed in order to carry the load on the trolley, e.g., to carry the loaded reels, and to properly function to move the reel R' over a variety of differing terrains, to pay out the wire or cable, to wind wire or cable onto the reel R' and the like. One disadvantage of using a rigid carriage is that on uneven terrain, one or more of the wheels may come off of the ground as a result of, for example, an opposite wheel moving into a shallow dip in the ground.

In an embodiment, the trolley carriage 314 is formed from two sections 314 a,b that are essentially mirror images of one another. Each section 314a,b includes a longitudinal member 318. The two sections 314a,b are joined to one another at joint members or plates 315 at each of the transverse connecting members 322 and by the shaft 334 on which the reel R' resides. Each plate 315 includes a pair of slotted, angled openings 317. Fasteners 319, such as bolts, extend through the openings 317 to join the plates 315 and thus the carriage sections 314a,b to each other. The slotted openings 317 are angled downwardly toward one another.

The fasteners 319 are sufficiently tight to maintain the structural integrity of the carriage 314 (and thus the trolley 310), but allow the two sections 314a,b to pivot slightly relative to one another so that not all four wheels 324, 326 need to remain coplanar as the trolley 310 traverses along uneven terrain. As such while the wheels 324a,326a on each of the carriage sections 314a,b will remain collinear with each other the two lines defined by the wheels need not remain parallel to one another as the trolley 310 traverses over the uneven terrain.

The transmission 338 can be mounted to the trolley 310 at the hub 334, or in line with the reel shaft 316. In such an embodiment a planetary gear set 335 can be used which eliminates the need for a drive (such as a chain or belt) between the transmission 334 and the shaft 316. That is, there is direct drive between the reel R' and the transmission 338. In addition, in order to reduce the material needed for the trolley and to reduce the weight of the trolley commensurately, the drive train 336 from the transmission 338 to the drive wheels 324 can be routed through the upstanding support beam 325 which can then eliminate the chain guard 273 (see FIG. 14). Again, the drive 336 from the transmission 338 to the drive wheels 324 can be a chain drive, a belt drive, drive shafts, or other suitable power transmission member.

Various other features are contemplated for all or some of the various embodiments of the trolley 10, 110, 210 310, all of which features may be included as desired in any or all of the disclosed embodiments.

For example, it is contemplated that the trolley can be used with a non-carriage mounted reel. That is, the trolley can be configured such that is accommodates a conventional wood, metal or other reel. In such a configuration, the trolley can be adapted so that the transmission 338 can be a stand-alone component and can be fitted onto a hub, for example, hub 334 mounted to the conventional reel R. It is contemplated that, for example, the hub 334 provides an adaptor so that a conventional smaller diameter shaft is secured in the larger trolley hub 334. The reel R and transmission 338 can then be fitted or mounted to the carriage. In addition to conventional reels, the trolley 310, for example, as seen in FIG. 19, can accommodate compartmentalized reels R' that store multiple type and/or sizes of cable.

Figure 19:
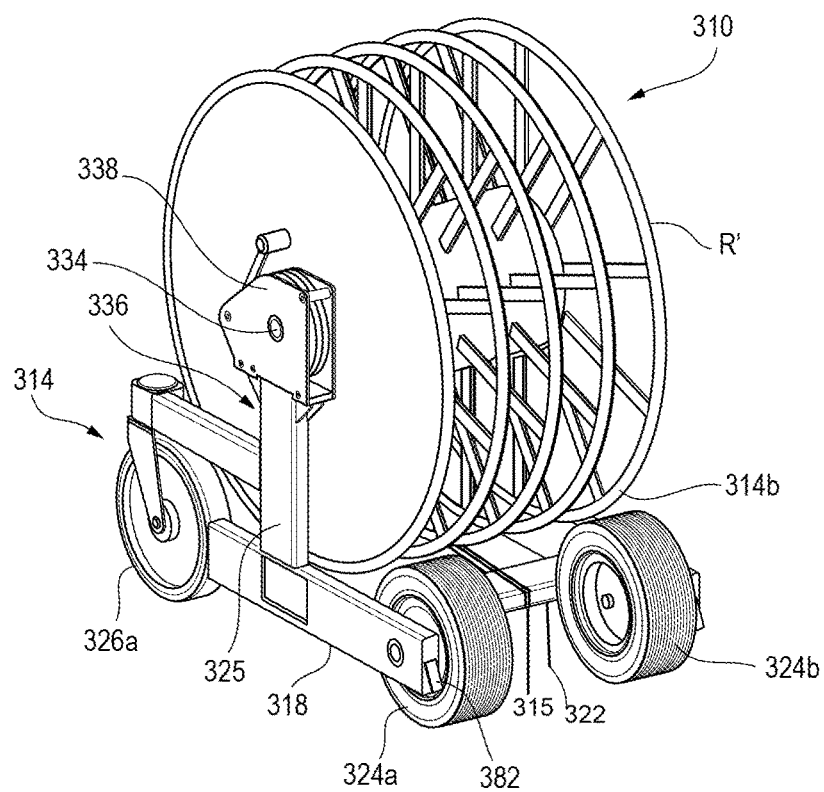
FIG. 19 is an illustration of an embodiment of the trolley.
Figure 20:
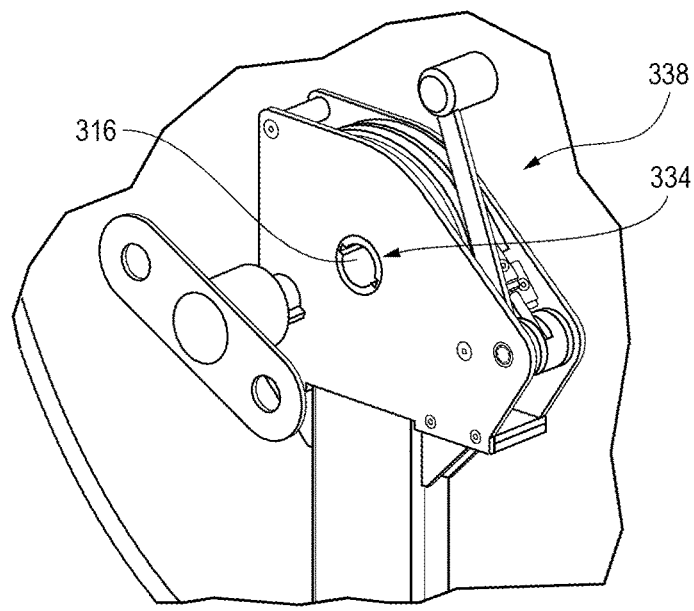
FIG. 20 is an illustration of the transmission of the trolley shown in FIG. 19.
Figure 21:
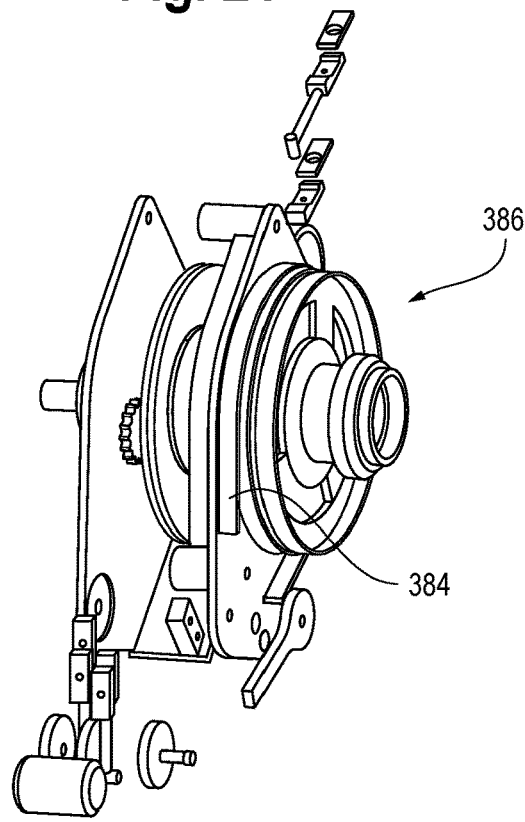
FIG. 21 is a an exploded view of a portion of a transmission and planetary gear set of an embodiment of the trolley.
Figure 22:
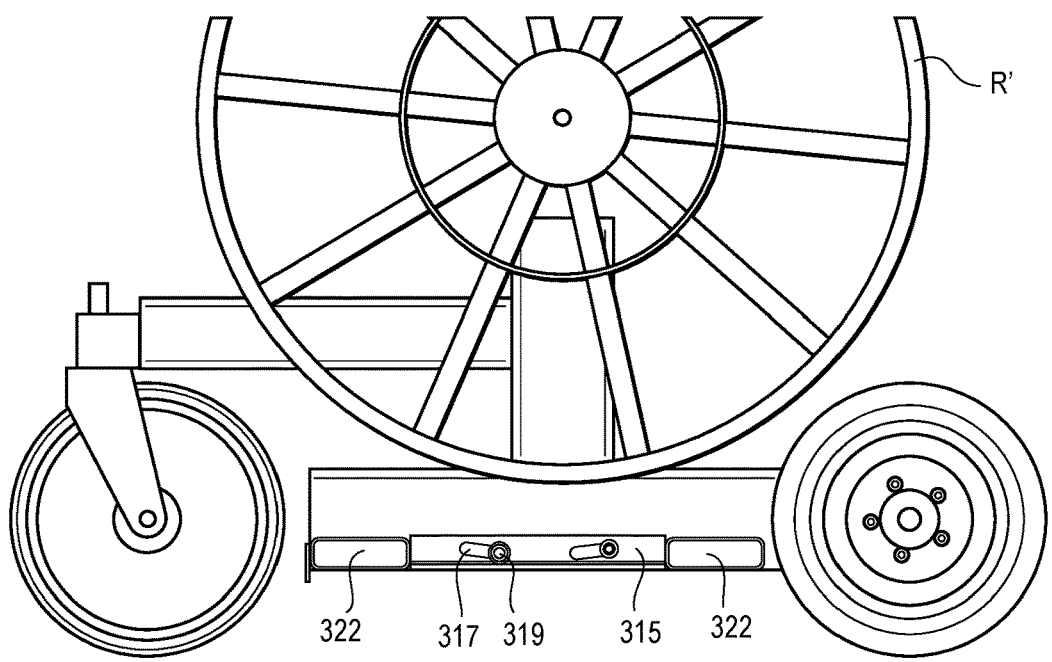
FIG. 22 is an illustration of an embodiment of the trolley showing a flexible carriage portion to provide a terrain leveling feature.

The trolley 310 can also include one or more brakes, such as the brake illustrated at 382 in FIG. 19. Various types of brakes are contemplated, such as an electronic brake to automatically stop the trolley in the event, for example that the drive chain or belt, if used, fails. In one embodiment, the brake can be configured as interlocking teeth on the drive wheels 324. Brakes can also be mounted to the idle wheels as, for example, parking brakes. A brake can also be integrated into the reel and/or the transmission 338 (for example, a friction belt 384 or like element on the planetary gear set 386 or hub 334) to prevent unwanted or inadvertent movement of the trolley 310. The brake 382 can also be configured as a chain tensioner or the like. The brake or brakes 382 can be integrated into the transmission 338, for example, selecting a gear position between operating modes, to provide for selectively braking, rather than fully braking, any of the trolley 310 operating modes.

Movement of the trolley can be manual, e.g., by rotating the reel R in drive gear/mode, or by pushing/pulling the trolley 310 in neutral gear/mode. It is also contemplated that the trolley 310 can be powered by, for example, an electric motor to facilitate continuous movement of the trolley or to provide a start assist when the trolley is moving along an incline or is heavily loaded. Such a powered assist can be a single drive for both drive wheels 324 or wheel independent motive force. Other ways in which a start assist can be provided are a pry bar, wind-up or tension spring, levered step, manual pull lever with a reduction gear, and the like.

It is also contemplated that the trolley 310 can be configured with a steering mechanism. For example, the idle (caster) wheels 326 can be joined to one another by a tie rod or the like that maintains the wheels parallel to one another. A steering device, such as a lever, wheel or drive (for example, a worm screw) can be operably connected to the wheels 326 to facilitate steering the trolley 310 by the idle (caster) wheels 326.

Figure 23:
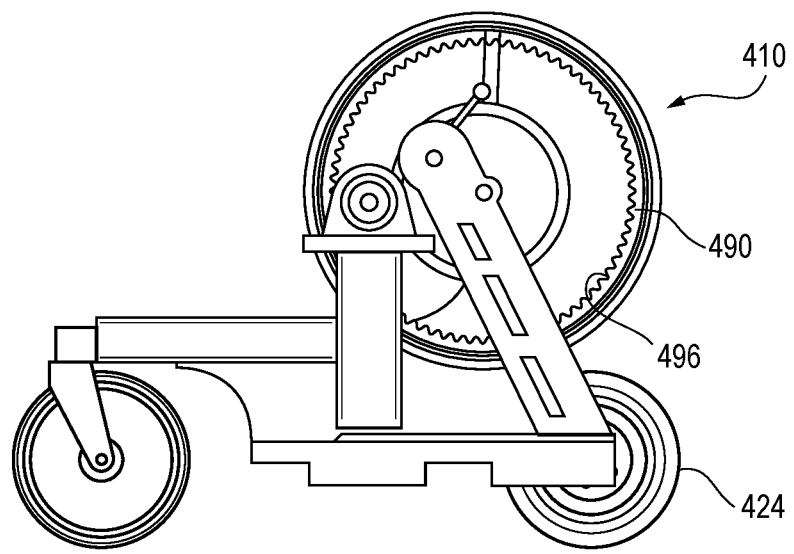
FIG. 23 illustrates an embodiment of the trolley having an independent drive element.
Figure 24:
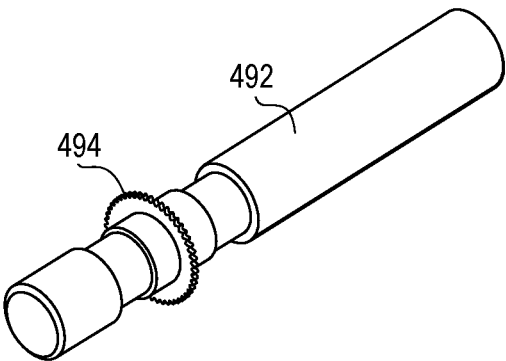
FIG. 24 is a partial, enlarged view of one configuration of a drive for the independent drive element.

FIGS. 23 and 24 illustrate an embodiment 410 in which the motive force for driving the drive wheels 424 is independent of rotation of the reel R. In this embodiment, a drive member 490, such as the illustrated internal toothed gear is operably connected to a drive shaft 492. The drive shaft 492, in turn, transfers power to the drive wheels 424 by, for example, a chain drive, belt drive, shaft or the like. The drive shaft 492 includes a gear 494 that meshes with the teeth 496 in the internal toothed gear 490 to transfer power to the drive wheels 424.

As illustrated, the internal toothed gear 490 can be concentrically positioned with the reel R, but rotates independently of the reel R. That is, to move the trolley 410, the internal toothed gear 490 is rotated about its axis, which transfers power to the drive wheels 424. Although the internal toothed gear 490 is shown mounted concentrically with the reel R, it will be appreciated that the internal toothed gear 490 does not need to be concentrically mounted with the reel R, but can be mounted offset from the reel R axis. The other portions of the drive train can be as described above with respect to the other disclosed embodiments.

It is understood that any of the features described with respect to the disclosed embodiment may be implemented, used together with, or replace other described features.

It will be appreciated by those skilled in the art that the relative directional terms such as sides, upper, lower, rearward, forward and the like are for explanatory purposes only and are not intended to limit the scope of the disclosure.

All patents referred to herein, are hereby incorporated herein in their entirety, by reference, whether or not specifically indicated as such within the text of this disclosure.

In the present disclosure, the words "a" or "an" or "the" are to be taken to include both the singular and the plural, where appropriate, and that any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A driven reel trolley comprising:
a carriage having a lower carriage section formed from opposing longitudinal members and transverse connecting members extending between and connecting the opposing longitudinal members;
a pair of opposing support beams extending upwardly from the lower carriage, the support beams each having a shaft support opening at about the top thereof for accommodating an associated shaft;
a pair of non-driven wheels mounted to the lower carriage section on opposing transverse sides of the lower carriage section;
a pair of drive wheels mounted to the lower carriage section, on opposing transverse sides of the lower carriage section, longitudinally spaced from the non-driven wheels;
a pair of drive trains, each drive train operably connecting the shaft and a respective one of the drive wheels, each drive train including a transmission, wherein each transmission is operably engageable with and disengageable from the shaft and its respective drive wheel and is operable in at least a park mode, a neutral mode and a drive mode, the transmissions being operable independently of each other, wherein in the park mode, the shaft rotates freely relative to and is disengaged from the drive wheel, in the neutral mode the shaft and drive wheel rotate freely, independent of and disengaged from each other, and in the drive mode, the shaft and drive wheel are engaged with one another and rotation of the shaft rotates the drive wheel.

2. The trolley of claim 1, wherein each transmission includes an input side and an output side, the shaft being operably connected to the input side and the output side being operably connected to its respective drive wheel.

3. The trolley of claim 2 wherein the transmission input side includes an input gear and the output side includes an output gear, and wherein the shaft includes a shaft gear operably connected to the input side gear and the drive wheel includes a wheel gear operably connected to the output side gear.

4. The trolley of claim 1 wherein each transmission includes a gear set to operably engage the shaft with its respective drive wheel, and to operably disengage the shaft from and its respective drive wheel.

5. The trolley of claim 4 wherein each transmission gear set is a planetary gear set.

6. The trolley of claim 4 including a hub positioned at about each shaft support opening, each hub housing, at least in part, the gear set.

7. A driven reel, comprising:
a carriage having a lower carriage section formed from opposing longitudinal members and transverse connecting members extending between and connecting the opposing longitudinal members;
a pair of opposing support beams extending upwardly from the lower carriage, the support beams each having a shaft support opening at about the top thereof for accommodating an associated shaft;
a pair of non-driven wheels mounted to the lower carriage section on opposing transverse sides of the lower carriage section;
a pair of drive wheels mounted to the lower carriage section, on opposing transverse sides of the lower carriage section, longitudinally spaced from the non-driven wheels;
a pair of drive trains, each drive train operably connecting the shaft and a respective one of the drive wheels, each drive train including a transmission, wherein each transmission is operably engageable with and disengageable from the shaft and its respective drive wheel and is operable in at least a park mode, a neutral mode and a drive mode, the transmissions being operable independently of each other,
wherein the carriage is formed from two opposing, substantially mirror image sections, the sections joined to one another at plates, the plates having elongated angled openings.

8. The trolley of claim 3 wherein the shaft gear is operably connected to the input gear by a chain or belt and the drive wheel gear is operably connected to the output gear by a chain or belt.

9. A driven reel trolley comprising:
first and second opposing, spaced apart carriage sections, the carriage sections configured to receive a reel mounted on an axle between the carriage sections, each carriage section including a drive leg having a drive leg wheel mounted thereto, each carriage section further including a steerable idler wheel spaced from its respective drive leg wheel, each carriage section further including a center hub for receiving the axle, each carriage section including a drive train operably connecting the center hub to the drive leg wheel,
wherein each of the first and second sections includes a transmission, the first section transmission and second section transmission being operable independent of each other and operably connected to a respective one of the drive leg wheels.

10. The trolley of claim 9 wherein each transmission has one or more of a drive gear, a neutral gear and a park gear.

11. A driven reel trolley, comprising:
a carriage having a lower carriage section formed from opposing longitudinal members and transverse connecting members extending between and connecting the opposing longitudinal members;
a pair of opposing support beams extending upwardly from the lower carriage, the support beams each having a shaft support opening at about the top thereof for accommodating an associated shaft;

a pair of steerable wheels mounted to the lower carriage section, on opposing transverse sides of the lower carriage section;
a pair of drive wheels mounted to the lower carriage section, on opposing transverse sides of the lower carriage section, longitudinally spaced from the steerable wheels;
a pair of drive trains, each drive train operably connecting the shaft and a respective one of the drive wheels, each drive train including a transmission, wherein each transmission is operably engageable with and disengageable from the shaft and its respective drive wheel and is operable in at least a park mode, a neutral mode and a drive mode, the transmissions being operable independently of each other,
wherein the carriage is formed from two opposing, substantially mirror image sections, the sections joined to one another to permit pivotal movement of the sections relative to one another.

12. The trolley of claim 11, wherein the steerable wheels are non-driven wheels.

\* \* \* \* \*

UNITED STATES PATENT AND TRADEMARK OFFICE
CERTIFICATE OF CORRECTION

PATENT NO. : 10,589,959 B2
APPLICATION NO. : 15/832141
DATED : March 17, 2020
INVENTOR(S) : Kenneth LeVey Page 1 of 1

It is certified that error appears in the above-identified patent and that said Letters Patent is hereby corrected as shown below:

In the Specification

1. In Column 2, Line 36, delete "wheels;" and insert -- wheels. --, therefor.
2. In Column 3, Line 64, delete "illustrated" and insert -- illustrates --, therefor.
3. In Column 3, Line 67, delete "trolley" and insert -- trolley; --, therefor.
4. In Column 4, Line 34, delete "trolley." and insert -- trolley; --, therefor.
5. In Column 4, Line 37, delete "is a an" and insert -- is an --, therefor.
6. In Column 5, Line 6, delete "frame 10" and insert -- frame 18 --, therefor.
7. In Column 6, Line 15, delete "frame 16." and insert -- frame 18. --, therefor.
8. In Column 6, Lines 16-17, delete "frame 16" and insert -- frame 18 --, therefor.
9. In Column 6, Lines 62-63, delete "wheels 120, 122" and insert -- wheels 124, 126 --, therefor.
10. In Column 7, Line 22, delete "sections 1141,b" and insert -- sections 114a,b --, therefor.
11. In Column 11, Line 26, delete "314 a,b" and insert -- 314a,b --, therefor.
12. In Column 11, Line 30, delete "shaft 334" and insert -- shaft 316 --, therefor.
13. In Column 11, Line 41, delete "324a,326a" and insert -- 324a, 326a --, therefor.
14. In Column 11, Line 50, delete "transmission 334" and insert -- transmission 338 --, therefor.

Signed and Sealed this
Eleventh Day of August, 2020

Andrei Iancu
*Director of the United States Patent and Trademark Office*